(12) United States Patent
Hodgart et al.

(10) Patent No.: US 8,964,813 B2
(45) Date of Patent: *Feb. 24, 2015

(54) RECEIVER OF BINARY OFFSET CARRIER (BOC) MODULATED SIGNALS

(75) Inventors: Matthew Stephen Hodgart, Guildford (GB); Paul David Blunt, Guildford (GB)

(73) Assignee: The University of Surrey, Gullford, Surrey (GB)

( * ) Notice: Subject to any disclaimer, the term of this patent is extended or adjusted under 35 U.S.C. 154(b) by 919 days.

This patent is subject to a terminal disclaimer.

(21) Appl. No.: 12/376,017

(22) PCT Filed: Aug. 10, 2007

(86) PCT No.: PCT/GB2007/003050
§ 371 (c)(1),
(2), (4) Date: Nov. 30, 2009

(87) PCT Pub. No.: WO2008/017860
PCT Pub. Date: Feb. 14, 2008

(65) Prior Publication Data
US 2010/0104046 A1  Apr. 29, 2010

(30) Foreign Application Priority Data

Aug. 10, 2006 (GB) .................... 0615930.5
Dec. 8, 2006 (GB) .................... 0624516.1

(51) Int. Cl.
*H04B 1/00* (2006.01)
*G01S 19/30* (2010.01)
*G01S 19/29* (2010.01)

(52) U.S. Cl.
CPC *G01S 19/30* (2013.01); *G01S 19/29* (2013.01)
USPC .......... 375/147; 375/140; 375/146; 375/150; 375/261

(58) Field of Classification Search
CPC ................................. G01S 19/30; G01S 19/29
USPC ................ 375/140, 347, 145, 147, 150, 261; 370/203, 315
See application file for complete search history.

(56) References Cited

U.S. PATENT DOCUMENTS

| 5,535,278 A | 7/1996 | Cahn et al. |
| 6,125,135 A | 9/2000 | Woo et al. |

(Continued)

FOREIGN PATENT DOCUMENTS

| EP | 1 598 677 A1 | 11/2005 |
| EP | 1 681 773 A1 | 7/2006 |

(Continued)

OTHER PUBLICATIONS

UK Search Report under Section 17(5) for Application No. GB0624516.1 dated Jun. 28, 2007.

(Continued)

*Primary Examiner* — Dhaval Patel
(74) *Attorney, Agent, or Firm* — Cook Alex Ltd.

(57) ABSTRACT

Binary Offset Carrier (BOC) is the agreed modulation for signals of next generation Global Navigation satellite systems (GNSS). Compared to current phase shift keying (PSK) modulation by a code, there is a further modulation by a sub-carrier. There is a known major difficulty with BOC called 'false lock' where early/late gates settle on the wrong peak of the multi-peaked correlation function. This invention eliminates the problem by eliminating that correlation. Instead, a two dimensional correlation is tracked independently to realize a dual estimate. An unambiguous lower accuracy estimate derived from the code phase is used to make an integer correction to a higher accuracy but ambiguous independent estimate based on the sub-carrier phase. The actual receiver may adopt a triple loop, instead of the usual double loop, where carrier phase, sub-carrier phase and code phase are tracked independently but interactively.

19 Claims, 10 Drawing Sheets

(56) References Cited

U.S. PATENT DOCUMENTS

| | | | |
|---|---|---|---|
| 6,404,801 | B1 | 6/2002 | Lennen |
| 6,463,091 | B1 | 10/2002 | Zhodzicshsky et al. |
| 6,658,048 | B1 | 12/2003 | Valio |
| 6,922,167 | B2 * | 7/2005 | Gerein ............ 342/357.74 |
| 7,064,707 | B2 | 6/2006 | Martin |
| 7,440,493 | B2 | 10/2008 | Pietila et al. |
| 7,471,241 | B1 | 12/2008 | Yang |
| 7,508,865 | B2 | 3/2009 | Miller et al. |
| 7,916,771 | B2 * | 3/2011 | Julien et al. ............ 375/145 |
| 2004/0071200 | A1 | 4/2004 | Betz et al. |
| 2005/0248483 | A1 | 11/2005 | Martin |
| 2010/0135364 | A1 * | 6/2010 | Hodgart ............ 375/147 |

FOREIGN PATENT DOCUMENTS

| | | |
|---|---|---|
| WO | WO 2004/092761 | 10/2004 |
| WO | WO 2006/027004 | 3/2006 |

OTHER PUBLICATIONS

International Search Report and Written Opinion for PCT/GB2007/003050 dated Nov. 27, 2007.

Preliminary Report on Patentability for PCT/GB2007/003050 dated Feb. 10, 2009.

Lin, V., et al., "Study of the Impact of False Lock Points in Subcarrier Modulated Ranging Signals and Recommended mitigation Approaches", ION Annual Meeting, Jun. 23, 2003.

Ward, P.W., "A Design Technique to Remove the Correlation Ambiguity in Binary Offset Carrier (BOC) Spread Spectrum Signals" Proceedings of the ION National Technical Meeting, Jan. 26, 2004.

Fabio, Dovis, et al., "A Novel Algorithm for the Code Tracking of BOC (n,n) Modulated Signals", ION GNSS 18th International Technical Meeting, Sep. 15, 2005.

Kim, S., et al., "A Novel Unambiguous Multipath Mitigation Scheme for BOC(kn n) Tracking in GNSS", Proceedings of the 2007 International Symposium on Application, IEEE, 4 pages, dated 2007.

Lohan, E.,et al, Correlation properties of Multiplexed Binary Offset Carrier (MBOC) modulation, Institute of Communications Engineering, Tampere University of Technology, 7 pages, undated.

Nunes, F., et al. "Innovations-based Coe Discriminator for GPS/Galileo BOX Signals", Instituto de Telecommunicaoes, Lisboa, Portugal, IEEE 2004, pp. 4127-4131.

Notification of Transmittal of the International Search Report and Written Opinion for PCT/GB2008/000206 dated May 30, 2008.

PCT International Preliminary Report on Patentability for PCT/GB2008/000206 dated Jul. 28, 2009.

UK Intellectual Property Office Search Report under Section 17(5) for GB Application No. GB0701296.6 dated May 14, 2007.

Hein, G.W. et al., "MBOC: the New Optimized Spreading Modulation Recommended for GALILEO L1 OS and GPS L1C," Position, Location and Navigation Symposium, 2006 IEEE/ION, pp. 883-892.

Non-Final Office Action in U.S. Appl. No. 12/522,032 dated Feb. 1, 2012.

Non-Final Office Action in U.S. Appl. No. 12/522,032 dated Jul. 24, 2012.

Olivier Julien, Christophe Macabiau, M. Elizabeth Cannon, Gerard Lachapelle, "ASPeCT: Unambiguous Sine-BOC(n,n) Acquisition/Tracking Technique for Navigation Applications", IEEE Transactions on Aerospace and Electronic Systems, vol. 43, No. 1, Jan. 2007; pp. 150-162.

M. Stephen Hodgart, Paul D. Blunt, Martin Unwin, "Double Estimator A New Receiver Principle for Tracking BOC Signals", InsideGNSS, Spring 2008; pp. 20-29, www.insidegnss.com.

Pratibha B. Anantharamu, Daniele Borio, Gerard Lachapelle, "Pre-Filtering, Side-Peak Rejection and Mapping: Several Solutions for Unambiguous BOC Tracking", ION GNSS 2009, Session F5, Savannah, GA, Sep. 22-25, 2009; pp. 1-14.

Nicolas Martin, Nerve Guichon, "BOC ambiguity resolution aided by virtual sub-carrier tracking for multi-path mitigation", (8 pages), GNSS 2009.

Olivier Julien, Christophe Macabiau, Emmanuel Bertrand, "Analysis of Galileo E1 OS unbiased BOC/CBOC tracking Techniques for Mass Market Applications", (8 pages), 2010 IEEE.

Alexander Ruegamer, Ion Suberviola, Frank Foerster, Guenter Rohmer, Andriy Konovaltsev, Nikola Basta, Michael Meurer, Jan Wendel, Melanie Kaindl, Stefan Baumann, "A Bavarian Initiative towards a Robust Galileo PRS Receiver", (11 pages), From: http://elib.dlr.de/71147/1/BaSE_Paper_final_ION.pdf., ION 2011.

J. Alegre-Rubio, C. Palestini, G. Lopez-Risueno, G. Corazza, "Code Tracking of High-Order BOC modulations in the Presence of Signal Distortion and Multipath", (15 pages), GNSS 2011.

Olivier Julien, Christophe Macabiau, Laboratoire de Traitement du Signal et des Telecommunications, Exole Nationale de l'Aviation Civile (ENAC) Toulouse, France, Analysis of Galileo E1 OS unbiased BOC/CBOC tracking Techniques for Mass Market Applications, 978-1-4244-8739-4/10$26.00 Copyright 2010 IEEE.

Pratibha B. Anantharamu, Daniele Borio and Gerard Lachapelle, Plan Group, Department of Geomatics Engineering, University of Calgary, "Pre-Filtering, Side-Peak Rejection and Mapping: Several Solutions for Unambiguous BOC Tracking", Sep. 2009.

Philipp Neumaier, Fabio Garzia, Philipp Sommer, Alexander Rugamer, Gunther Rohmer, Jan Wendel, Frank Max Schubert, Fraunhofer Institute for Integrated Circuits IIS, Nuremberg, Germany; Astrium GmbH, Germany; "Experimental BOC Tracking Hardware Platform", http://www.iis.fraunhofer.de/content/dam/iis/de/dokumente/In/Referenzprojekte/ion_itm_14_paper_neumaier.pdf—accessed Aug. 15, 2014.

Daniele Borio, Member, IEEE, "Double Phase Estimator: a New Unambiguous BOC Tracking Algorithm", http://www.danieleborio.altervista.org/papers/journals/doublephase_borio_dec13.pdf—accessed Aug. 15, 2014.

* cited by examiner

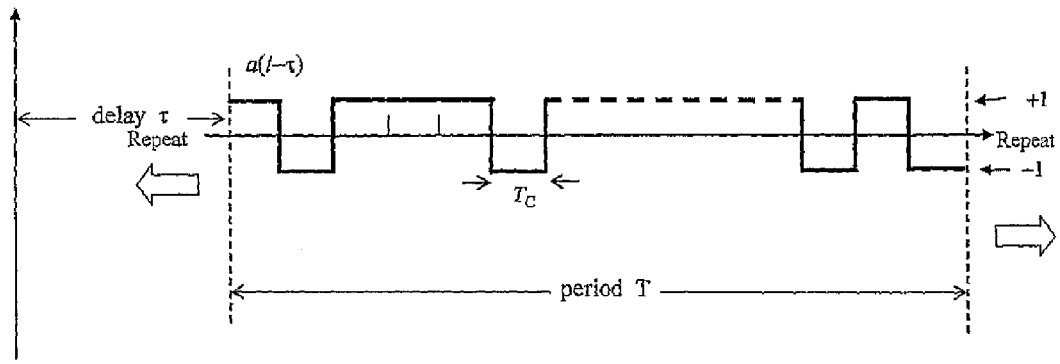
Fig 1 - Prior Art
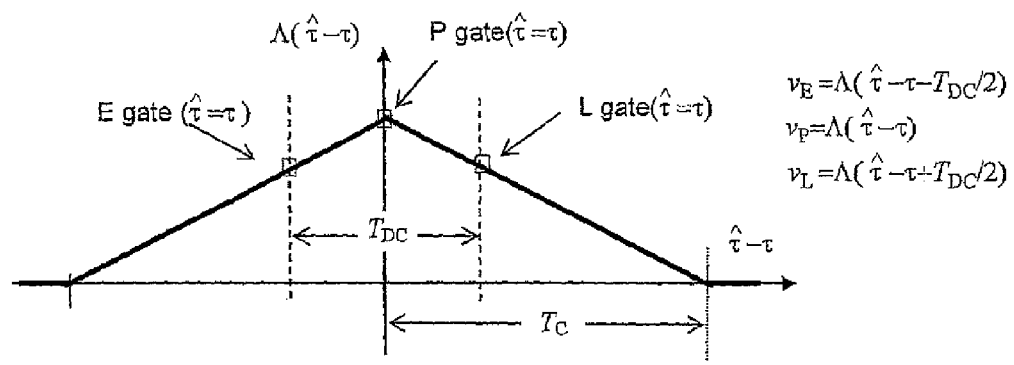
Fig 2 - Prior Art
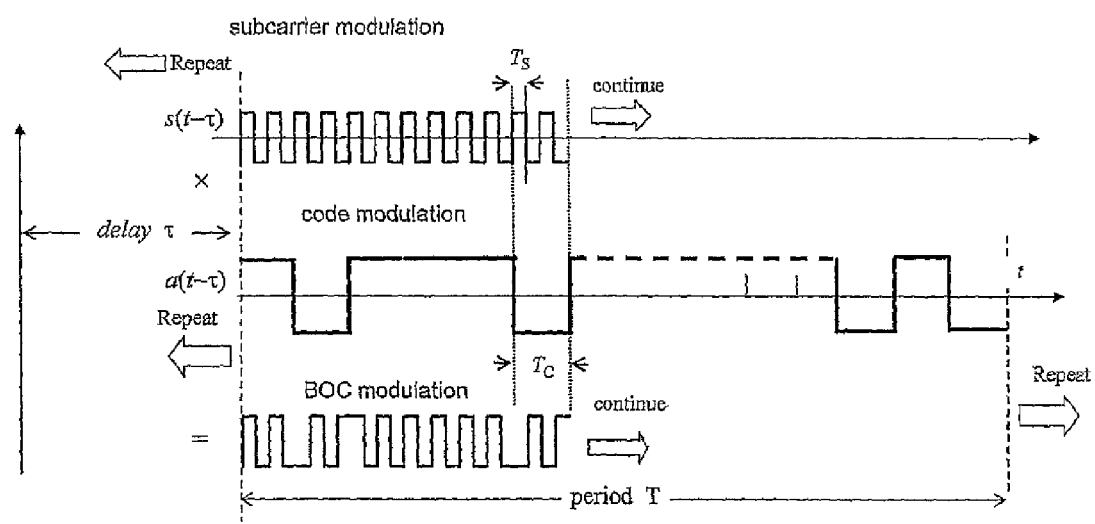
Fig 3 - Prior Art

RECEIVER OF BINARY OFFSET CARRIER (BOC) MODULATED SIGNALS

FIELD OF THE INVENTION

The present invention relates to the reception of Binary Offset Carrier (BOC) modulated signals and similar such signals. One particular application of the invention is the reception of BOC modulated navigation signals in a Global Navigation Satellite System (GNSS).

BACKGROUND TO THE INVENTION

In a GNSS, a receiver estimates delays $\tau$ in the navigation signals received from different satellites and uses this information, combined with information on the position of the satellites, to estimate its position. The more accurate the estimation of the delays $\tau$, the more accurately the receiver can estimate its position.

The United States led Global Positioning System (GPS) is presently the GNSS in most common use. Navigation signals transmitted by GPS satellites are modulated using a Phase Shift Keying (PSK) modulation of a code onto a carrier signal having a designated carrier frequency. The modulation involves altering the phase of the carrier signal by fixed amounts (0 or $\pi$) at a code rate $f_C$, each symbol of the code having duration $T_C = 1/f_C$ and the code being repeated with time period $T_G$. A navigation signal received at a receiver from a satellite can therefore be represented by an equivalent bi-modal amplitude modulation function $a(t-\tau)\epsilon(-1, +1)$ with period $T_G$, as shown in FIG. 1.

The receiver estimates the delay $\tau$ by comparing the received signal to a locally generated reference signal. The reference signal consists of an in-phase and quadrature-phase (I and Q) carrier modulated with the same code as the input signal. The reference modulation can be represented mathematically as $a(t-\hat{\tau})$ where $\hat{\tau}$ is a trial delay. The comparison typically consists in multiplying the received signal by the I and Q reference to yield a demodulated signal. The demodulated signal is then integrated over a given time, usually the same as the period $T_G$ of the code, to output a value known as a correlation. The correlation depends on the difference between the trial delay $\hat{\tau}$ of the reference signal and the true delay $\tau$ of the received signal and can be expressed as a correlation function $\Lambda(\hat{\tau}-\tau)$. As shown in FIG. 2, this correlation function for a PSK modulated signal is triangular and peaks when the trial delay $\hat{\tau}$ matches the true delay $\tau$. The width of the correlation function is twice the symbol duration $T_C$, i.e. $2T_C$.

Calculating the entire correlation function $\Lambda(\hat{\tau}-\tau)$ over all $\hat{\tau}$ and analysing it to determine its peak and hence identify the delay $\tau$ of the received signal is a computationally time-consuming task. Most conventional GPS receivers therefore compute just three sampled correlations simultaneously, using three reference signals offset in time from one another. The three correlations are usually referred to as gate values of Early (E), Prompt (P) and Late (L) gates. The E and L gates are offset from one another by a time separation $T_{DC}$, so that they can be considered to have trial delays $$\hat{\tau} - \frac{T_{DC}}{2} \text{ and } \hat{\tau} + \frac{T_{DC}}{2}$$

respectively. The P gate can then be considered to have trial delay $\hat{\tau}$ half way between these trial delays of the E and L gates. So, as illustrated in FIG. 2, when the E and L gate values are equal, the P gate value yields the peak value of the correlation function $\Lambda(\hat{\tau}-\tau)$ and the trial delay $\hat{\tau}$ is equal to the true delay $\tau$.

An iterative algorithm can be used to arrive at this state. When the trial delay $\hat{\tau}$ is not equal to the true delay, the P gate will be offset from the peak of the correlation function $\Lambda(\ )$ and there will be a difference in the values of the E and L gates. So, an error signal proportional to the difference between the trial delay $\hat{\tau}$ and the true delay $\tau$ can be generated by subtracting the L gate value from the E gate value. This can be used to iteratively adjust the trial delay $\hat{\tau}$ toward the true delay $\tau$. A best estimate of the true delay is then deemed to be the value of the trial delay (of the P gate) when the E gate value is equal to the L gate value (as shown in FIG. 2).

It is presently intended to improve the American GPS by adding new navigation signals to the system. The independent European Galileo system will use similar new navigation signals in both the same and new frequency bands. While some of the new navigation signals will continue to use PSK modulation, most of them will be modulated using the new Binary Offset Carrier (BOC) modulation.

Like PSK modulation, BOC modulation involves modulating a code onto a carrier. The code is similar to that used in PSK modulation, and the code in the received signal can again be represented by an equivalent bi-modal amplitude modulation function $a(t-\tau)$ having code rate $f_C$, symbol duration $T_C$ and periodicity $T_G$. However, BOC modulation involves further modulating the signal by a sub-carrier, which can be represented by a sub-carrier modulation function $s(t-\tau)$ having sub-carrier rate $f_S$ and sub-symbol duration equivalent to a half-cycle $T_S = 1/(2f_S)$. As seen in FIG. 3, the sub-carrier modulation function $s(t-\tau)$ is a simple periodic square waveform. The sub-carrier rate $f_S$ is an integer multiple, or an integer-and-a-half multiple of the code rate $f_C$. The standard notation for BOC modulation reads $BOC(f_S, f_C)$. This figure shows what can be called 'sine-BOC' where the sub carrier has 0 deg phase shift relative to the code zero crossings. Also there is 'cosine-BOC' where the sub-carrier is phase shifted 90 deg relative to the code zero-crossings (not shown).

When a received BOC signal is correlated using a matching locally generated BOC reference signal the resulting correlation function $\mathcal{W}(\hat{\tau}-\tau)$ has multiple peaks. For example, referring to FIG. 4, this correlation function of a sine-BOC signal modulated using BOC($2f$, $f$) has three positive peaks and four negative peaks. The central positive peak corresponds to a match of the true delay $\tau$ of the received signal with the trial delay of the reference signal. The other, secondary peaks are separated at intervals of the sub-symbol duration $T_S$. Importantly, the envelope (dashed line) of this correlation function $\mathcal{W}(\hat{\tau}-\tau)$ is the same as the correlation function $\Lambda(\hat{\tau}-\tau)$ of a PSK modulated signal having the same code rate $f_C$.

Because the central peak of the BOC correlation function $\mathcal{W}(\hat{\tau}-\tau)$ has steeper sides than the peak of the equivalent PSK correlation function $\Lambda(\hat{\tau}-\tau)$, BOC modulation has the potential to allow more accurate delay estimation. Specifically, when the E and L gates are located on either side of the central peak then the error signal generated from the difference between the L gate value and the E gate value can steer the P gate to the top of the central peak and hence the trial delay $\hat{\tau}$ to the true delay $\tau$, as illustrated in the top part of FIG. 4. There is however an inherent ambiguity in the delay estimate for a BOC signal provided by the conventional delay estimation technique, as described above. When the E and L gates reside on either side of one of the secondary peaks, the error signal will steer the P gate to the secondary peak (which can be negative). In that situation, the error signal will be zero, just as it is when the P gate is at the top of the central peak, and the iteration will have converged to a value of the trial delay $\hat{\tau}$ that does not correspond to the true delay $\tau$. This is known as 'false lock' or 'slip', or 'false node tracking'.

A number of techniques have been proposed for overcoming this problem. One such technique, commonly referred to as 'bump jumping', is described in the paper "Tracking Algorithm for GPS Offset Carrier Signals", P. Fine et al, Proceedings of ION 1999 National Technical Meeting, January 1999. This technique takes advantage of the knowledge that adjacent peaks of the BOC correlation function $\text{\textbardbl}(\hat{\tau}-\tau)\text{\textbardbl}$ are separated from one another by the known sub-carrier symbol duration $T_S$. Specifically, the technique tests for correct location of the P gate using a pair of gates, called Very Early (VE) and Very Late (VL) gates, having trial delays $\hat{\tau}-T_S$ and $\hat{\tau}+T_S$ respectively. These are offset from the trial delay $\hat{\tau}$ of the P gate by the sub-carrier symbol duration $T_S$. So, if the P gate has converged to the top of one of the peaks, e.g. the receiver is in lock, the VE, P and VL gates are located on three adjacent peaks. At this stage, the VE, P and VL gate values are compared. If the VE and VL gate amplitudes are less than the P gate amplitude, the P gate is known to lie on the central peak and the trial delay $\hat{\tau}$ corresponds to the true delay. However, if the VE or VL gate amplitude is higher than the P gate value, the P gate is on a secondary peak. In this event, the trial delay $\hat{\tau}$ is incremented by the sub-symbol duration $T_S$ in the direction of whichever of the VE and VL gates has the higher (modulus) value. This action should cause the P gate to jump to the next peak toward the central peak. The comparison is then repeated to verify that the P gate is on the central peak or to cause repeated incrementing of the trial delay $\hat{\tau}$ until the P gate is located on the central peak.

Bump jumping allows a receiver to fully exploit the potential accuracy of BOC. However, there can be a significant waiting time before the delay estimate can be relied on. There is an elapsed time required to decide whether there is a false lock or not. This is longer for a low $C/N_0$, when the VE, P and VL gate values must also be averaged over a significant time in order to be sure which of the three tested adjacent peaks has the highest amplitude. The required time to detect false lock also increases proportionally with the ratio of the sub-carrier rate to the code rate $f_S/f_C$, because the difference of amplitude between adjacent peaks relatively decreases. It may also be necessary to correct false lock several times over successive secondary peaks before the central peak is found, a problem which is exacerbated as the ratio of the sub-carrier rate to the code rate $f_S/f_C$ increases, because the number of secondary peaks increases. Overall, the waiting time may range upwards to several seconds, which is certainly enough to have potentially disastrous consequences for a plane landing, ship docking or such like. Worse, the receiver does not know that it has been in a false lock safe until it actually jumps out of it. The bump jumping system therefore is not fail safe.

A further difficulty has now been realised since the launch of the first test satellite GIOVE-A transmitting BOC signals in December 2005. Non-linear and linear distortion in the transmitting chain can easily cause appreciable asymmetry in the actual correlation function $\text{\textbardbl}(\hat{\tau}-\tau)$—where the corresponding secondary peaks on either side of the main peak are no longer equal in amplitude. This inevitably degrades performance, and in a worst case, the bump jumping receiver simply does not work. "GIOVE-A in orbit testing results" M. Falcone, M. Lugert, M. Malik, M. Crisic, C. Jackson, E. Rooney, M. Trethey ION GNSS FortWorth Tex., September 2006.

The paper "Unambiguous Tracker for GPS Binary-Offset-Carrier Signals", Fante R., ION 59th Annual Meeting/CIGTF 22nd Guidance Test Symposium, 23-25 Jun. 2003, Albuquerque, N. Mex., describes another technique involving multiple sampling (gating) of the correlation function and then linear combination of these samples to synthesise a monotonic approximation to the PSK correlation function $\Lambda(\hat{\tau}-\tau)$ having no multiple peaks. This solution certainly eliminates false locks. However, this technique relies on a very complex receiver design. More fundamentally, it fails to realise the potential accuracy conferred by BOC modulation, because the shallower PSK correlation peak is relied on to resolve the delay estimate. Similarly, the paper "BOC(x, y) signal acquisition techniques and performances", Martin et al., Proceedings of ION GPS 2003, September 2003, Portland, Oreg., describes a technique that exploits the fact that the BOC modulated signal has a mathematical equivalence to two PSK modulated signals centred on two separate carrier frequencies; where the higher frequency $f_H$ is equal to the carrier frequency plus the sub-carrier frequency $f_S$, while the lower frequency $f_L$ is equal to the carrier frequency minus the sub-carrier frequency $f_S$. With appropriate processing the actual monotonic PSK correlation function $\Lambda(\hat{\tau}-\tau)$ can be recovered. But this method is again complex to implement and more fundamentally fails to realise the potential accuracy conferred by BOC modulation.

The present invention overcomes these problems.

SUMMARY OF THE INVENTION

According to a first aspect of the present invention, there is provided a receiver for receiving a navigation signal comprising a carrier modulated by a code modulation function of a given code rate and further modulated by a sub-carrier modulation function having a sub-carrier rate different to the code rate, the receiver comprising processing means arranged to:

generate a first estimate of delay based on the code modulation;

generate a second estimate of delay based on the sub-carrier modulation; and.

determine an optimal delay estimate from the first and second delay estimates.

The essence of the invention is that it estimates the signal delay in two independent ways and then combines the estimates to arrive at a signal optimal delay estimate. The prior art correlates the modulation in the received signal with only a single modulation function, which is the combined code modulation and sub-carrier modulation. Up to now, dealing with the complex correlation function which results from this action has been considered unavoidable, because the combined modulation has been perceived to be intrinsic and inseparable. The invention contradicts this perception. It recognises that correlating the received signal with the sub-carrier modulation function and code modulation function can be done separately, so avoiding the need to contemplate the conventional correlation function.

In all embodiments of the invention the delay in the BCC signal is estimated in two different and independent ways—in a double estimate. A first non-ambiguous lower accuracy estimate is used to resolve the ambiguities in a second higher accuracy estimate. This first estimate is derived only from the phase of the code modulation in the BOC signal; it treats the BOC modulation as a 'virtual' PSK and ignores the sub carrier. A second estimate is derived only from the phase of sub carrier modulation in the BOC signal and ignores the code. A three-loop receiver can be used for the optimal double estimate of the delay in a selected BOC transmission. In some embodiments an inner delay-locked loop (DLL) tracks the delay as embodied in the code phase; a middle sub-carrier locked loop (SLL) independently tracks the same delay as embodied in the sub-carrier phase, thus two independent delay estimates are calculated. A third outer loop may track and lock to the carrier phase and/or frequency of the particular satellite signal. All three loops may operate simultaneously, independently yet cooperatively. This implementation may be contrasted with a conventional receiver which uses only two loops, where the single delay estimate is derived from the tracking of the correlation function in a delay-locked loop (DLL) while in parallel and simultaneously the carrier phase and/or frequency is tracked by a second phase locked loop (PLL) or frequency locked loop (FLL).

By virtue of the dual estimate principle in this invention the BOC correlation function) $\Lambda\Lambda$( ) with its secondary peaks does not exist and there are no secondary peaks on which a false lock would occur.

In some embodiments of a three-loop receiver the DLL locks to the peak of the same $\Lambda$( )-shaped function as the standard GPS, so ensuring a smooth and non-ambiguous acquisition of a delay estimate. The SLL however locks to the nearest peak of the continuous sub-carrier correlation function—which is a triangular function of periodicity of the sub-carrier. This loop estimate has higher accuracy but has an inherent ambiguity in integer multiples of sub-carrier half cycles. There is no 'wrong peak' in this concept however and this ambiguity is however acceptable. For, in a further step, the ambiguity in this SLL estimate is automatically and instantly resolved by comparison with the DLL estimate.

The combination of SLL and DLL estimate now provide the inherently higher accuracy due to BOC modulation on the signal (comparing with PSK on the basis of the same chip rate), with the ambiguity now resolved.

Simulations show smooth consistent operation of this joint estimation process even in conditions of poor signal to noise.

The three-loop receiver can be implemented with the same variety of options that are available to two loop receivers. The standard option is to track the phase of the carrier—as in so-called 'coherent DLL' where the outer loop is phase locked to the carrier, using a phase discriminator. An alternative is to track the frequency of the carrier—as in so-called 'incoherent DLL' where the outer loop is frequency locked to the carrier, using a frequency discriminator. Various possible phase and frequency discriminators can be used.

Various possible discriminators for the SLL can also be used. A variety of standard discriminators for the DLL loop can also be used. Known technologies and variants, including methods for reducing effect of multipath and currently used in two-loop system will transfer to the new three loop system without complication.

Preferred embodiments of the invention are now described, by way of example only, with reference to the accompanying drawings.

BRIEF DESCRIPTION OF THE DRAWINGS

FIG. 1 is a graphical illustration of a PSK modulated signal according to the prior art;

FIG. 2 is a graphical illustration of a correlation function for the PSK modulated signal shown in FIG. 1 according to the prior art;

FIG. 3 is a graphical illustration of a basic sine-BOC modulated signal according to the prior art;

DETAILED DESCRIPTION OF THE PREFERRED EMBODIMENTS

Figure 4:
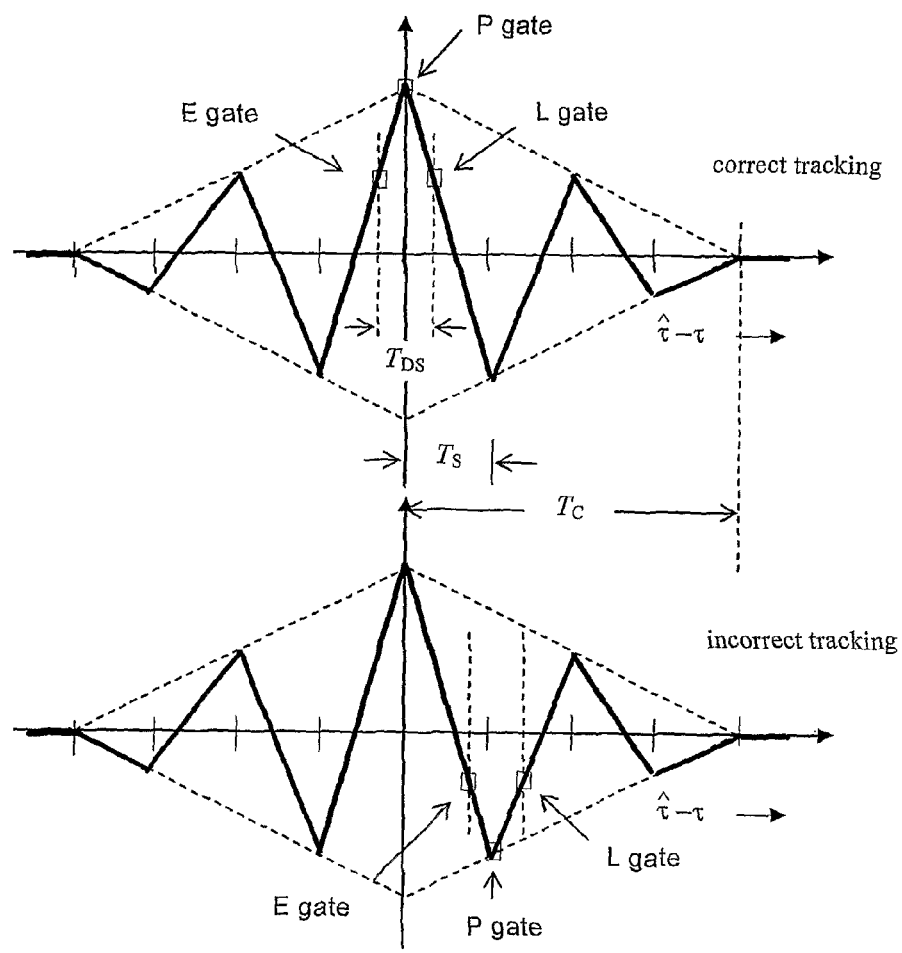
FIG. 4 is a graphical illustration of a correlation function for the BOC modulated signal shown in FIG. 3 according to the prior art, showing examples of both correct tracking and false tracking.
Figure 5:
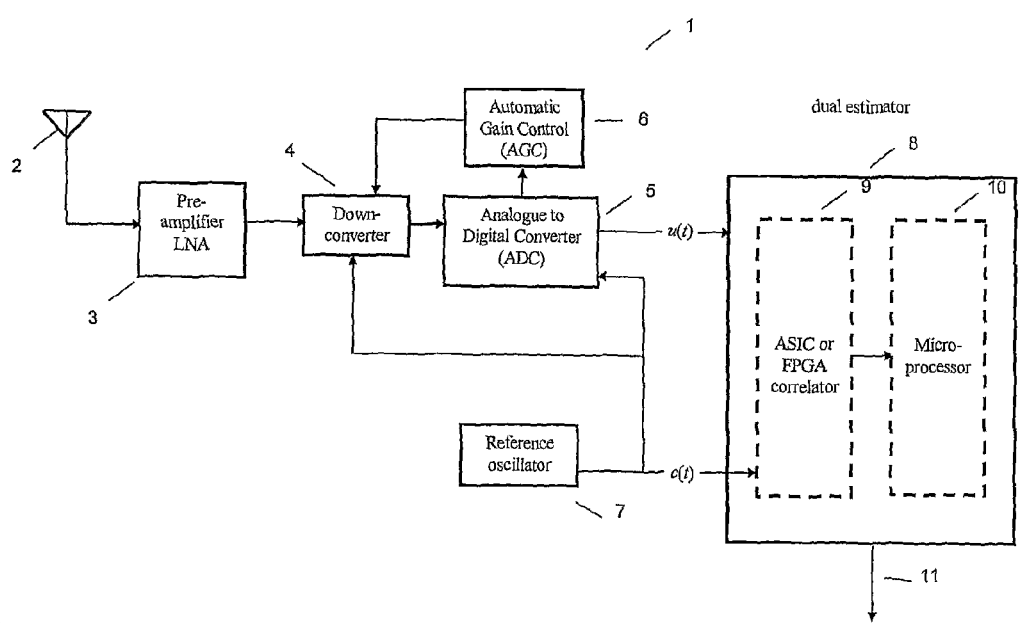
FIG. 5 is a schematic illustration of the overall BOC receiver according to a first preferred embodiment of the invention.

Referring to FIG. 5, a BOC receiver 1 according to a first preferred embodiment of the present invention is arranged to receive a BOC modulated signal via a right-hand circularly polarised antenna 2. The antenna 2 feeds the received signal to a pre-amplifier 3, which includes a filter for filtering the received signal, a circuit for blocking strong interfering signals and a Low Noise Amplifier (LNA) for amplifying the received signal. The LNA effectively sets the receiver's noise figure, normally around 2 dB, and provides around 30 dB gain. The pre-amplifier 3 feeds the filtered, amplified signal to a down-converter 4 for a first stage down-conversion of the signal to a suitable intermediate frequency (IF). The signal is down-converted in multiple stages and filtered to eliminate unwanted image signals.

The down-converter 4 feeds the down-converted signal to an Analogue to Digital Converter (ADC) 5 for converting the signal to the digital domain. The ADC 5 can quantise the signal to one, two or more bits. In this embodiment, because the ADC 5 uses multi-bit quantisation, the receiver 1 incorporates an automatic gain control (AGC) circuit 6 to maintain proper distribution of the signal across the quantisation levels. The output of the AGC circuit 6 feeds back to the down-converter 4 to enable control of the signal level input to the ADC 5 and hence maintain proper amplitude distribution of the signal output by the ADC 5. The ADC 5 is arranged to output the digital signal u(t) to the dual-estimator 8. This has a correlator stage 9 and a processing stage 10. In this embodiment, the dual estimator 8 is implemented in hardware. So, the correlator stage 9 comprises an Application Specific Integrated Circuit/Field Programmable Gate-Array (ASIC/FPGA) and the processing stage 10 is a microprocessor. The dual estimator 8 estimates the delay $\tau$ between transmission and reception of the received signal and outputs the delay estimate via output 11. A clock signal c(t) from reference oscillator at 7 is provided to the down-converter 4, ADC 6 and the dual estimator 8.

Figure 6:
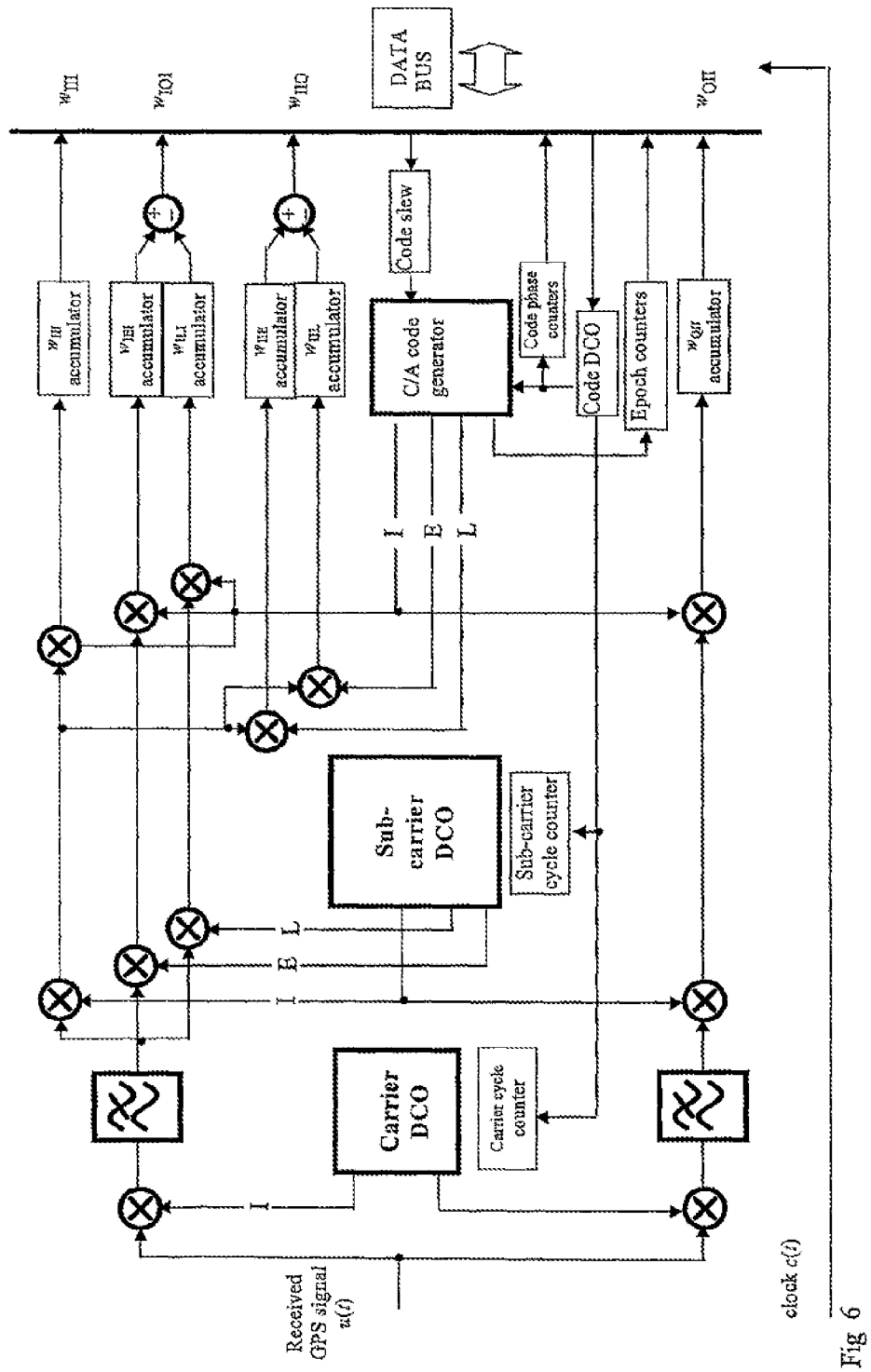
FIG. 6 is a general block diagram of the correlator means 9 of the receiver of FIG. 5.

FIG. 6 shows a first level of physical detail to the correlator 9. The input signal u(t) splits into an upper in-phase and lower quadrature arm and is processed through three stages. The incoming signal is mixed with replica carrier, sub carrier and code waveforms, each generated by separate digitally controlled oscillators (DCO) 12, 17, 18. First there is multiplication by a phase or quadrature reference signal from the carrier DCO; then multiplication by a prompt, early or late reference signal from the sub-carrier DCO and finally multiplication by a prompt, early or late reference signal from the C/A code generator. The resulting signal combinations are accumulated over the code period and six correlation results formed. The extreme right of the diagram shows the interaction through a data bus to the microprocessor 10.

Figure 7:
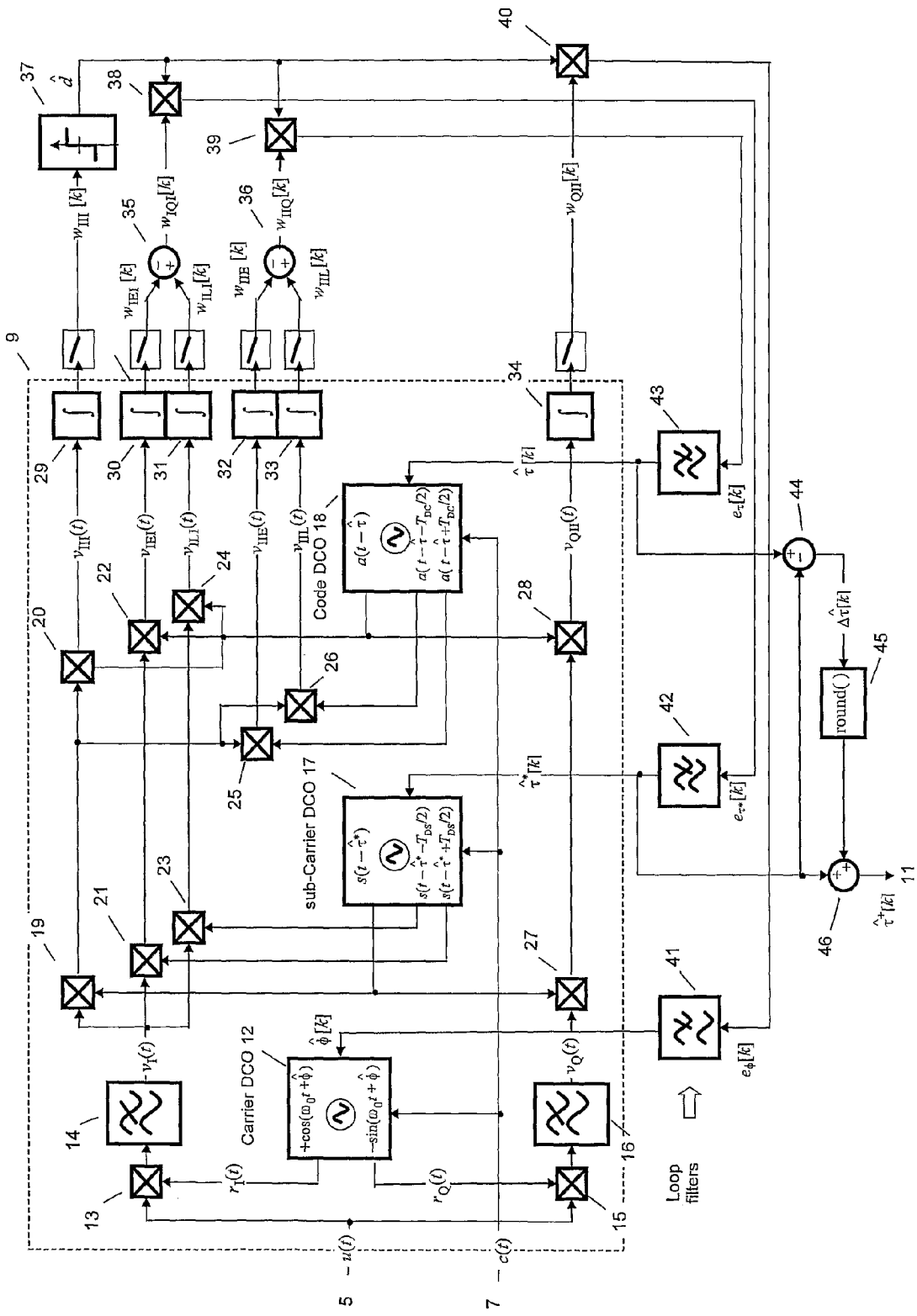
FIG. 7 is a functional expansion of the correlator 9 from FIG. 6 and also the signal processor 10.

FIG. 7 provides a more detailed functional description. The correlator sub-block 9 is identified. The remainder is the processing stage 10.

The input signal u(t) at 5 can be described (neglecting additive noise and other BOC signals simultaneously present) as $$u(t)=A\times\cos(\omega_0 t+\phi)\times s(t-\tau)\times a(t-\tau)\times d \tag{1}$$

where A is amplitude, $\cos(\omega_0 t+\phi)$ represents the carrier signal after down conversion to an intermediate frequency (IF) $\omega_0$ and phase $\phi$, $s(t-\tau)$ is the sub-carrier modulation in the received signal comprising the sub-carrier modulation function $s(t)$ at delay $\tau$, $a(t-\tau)$ is the code modulation in the received signal comprising the code modulation $a(t)$ at delay $\tau$ and $d\in(-1,+1)$ is a polarity.

The invention depends essentially on the fact that sub-carrier is half-periodic over a relatively short sub-chip width $T_S$ and that expression (1) is mathematically identical to $$u(t)=A\times\cos(\omega_0 t+\phi)\times s(t-\tau^*)\times a(t-\tau)\times d^* \tag{2}$$

where $$\tau^*=\tau+nT_S \tag{3}$$

is a multi-valued offset delay which has a number of values each offset from the delay $\tau$ by a different integer shift n times the sub-chip width $T_S$. The equivalent polarity $d^*=d$ for even number of shifts and $d^*=-d$ for an odd integer shift. It should be understood that the actual sub-carrier delay and the code delay for any actually received signal are still the same $\tau$. The receiver must always estimate this actual non-ambiguous delay $\tau$ in the code function $a(\ )$. It is however only necessary for the receiver to seek to estimate the ambiguous $\tau^*$ in the sub-carrier function $s(\ )$ and achieve the same result as if it were estimating the actual delay $\tau$. Accordingly, the offset delay $\tau^*$ and delay $\tau$ are treated as independent quantities, without regard to (3), and two independent estimates may be generated. Only in a final correction stage is it admitted that an estimate of offset delay $\tau^*$ and delay $\tau$ are related as in (3), and the value of estimate $\hat{\tau}$ used to remove the ambiguities in the value of estimate $\hat{\tau}^*$.

Referring to FIG. 7, the correlator stage 9 of the dual estimator 8 receives the digital signal u(t) from the ADC 5 and the clock signal c(t) from the reference oscillator 7. A carrier Digital Controlled Oscillator (DCO) 12 of the correlator stage uses the clock signal c(t) to generate In-phase (I) and Quadrature (Q) reference signals $r_I(t)$, $r_Q(t)$ at the IF $\omega_0$ with trial phase $\hat{\phi}$, e.g.

$$r_I(t)=+\cos(\omega_0 t+\hat{\phi}) \tag{4}$$

and $$r_Q(t)=-\sin(\omega_0 t+\hat{\phi}) \tag{5}$$

The I signal multiplier 13 then multiplies the digital signal u(t) with I reference signal $r_I(t)$ and the I signal filter 14 filters the result to output an I signal $v_I(t)$ which represents the I component of the received signal; while the Q signal multiplier 15 multiplies the digital signal u(t) with reference Q signal $r_Q(t)$ and the Q signal filter 16 filters the result to output Q signal $v_Q(t)$ which represents the Q component of the received signal.

The I and Q signals $v_I(t)$, $v_Q(t)$ can be described (neglecting additive noise and other BOC signals simultaneously present) as $$v_I(t)=A\times\cos(\phi-\hat{\phi})\times s(t-\tau^*)\times a(t-\tau)\times d \tag{6}$$

and $$v_Q(t)=A\times\sin(\phi-\hat{\phi})\times s(t-\tau^*)\times a(t-\tau)\times d \tag{7}$$

A sub-carrier DCO 17 uses the clock signal c(t) and the sub-carrier modulation function s(t) to generate Prompt (P), Early (E) and Late (L) gate sub-carrier reference signals $s(t-\hat{\tau}^*)$, $s(t-\hat{\tau}^*+T_{DS}/2)$ and $s(t-\hat{\tau}^*-T_{DS}/2)$ respectively, where $\hat{\tau}^*$ is a trial sub-carrier delay and $T_{DS}$ is the total separation between E and L gates. The separation $T_{DS}$ can be selected freely in the range $0<T_{DS}<T_S$.

Similarly, a code DCO 18 uses the clock signal c(t) and the code modulation function a(t) to generate P, E and L gate code reference signal $a(t-\hat{\tau})$, $a(t-\hat{\tau}T_{DS}/2)$ and $a(t-\hat{\tau}-T_{DS}/2)$, respectively, where $\hat{\tau}$ is a trial code delay and $T_{DC}$ is the total separation between E and L gates. The separation $T_{DC}$ can be selected freely in the range $0<T_{DC}<T_C$.

The correlator stage 8 continues by multiplying the I and Q signals $v_I(t)$, $v_Q(t)$ with appropriate combinations of the P, E and L gate sub-carrier reference signals $s(t-\hat{\tau}^*)$, $s(t-\hat{\tau}^*T_{DS}/2)$ and $s(t-\hat{\tau}^*-T_{DS}/2)$, and the P, E and L gate code reference signals $a(t-\hat{\tau})$, $a(t-\hat{\tau}T_{DS}/2)$ and $a(t-\hat{\tau}-T_{DS}/2)$ in order to generate six demodulated signals: an I sub-carrier P gate and I code P gate signal $v_{III}(t)$, an I sub-carrier E gate and I code P gate signal $v_{IEI}(t)$, an I sub-carrier L gate and I code P gate signal $v_{ILI}(t)$, and I sub-carrier P gate and I code E gate signal $v_{IIE}(t)$, an I sub-carrier P gate and I code L gate signal $v_{IIL}(t)$ and Q sub-carrier P gate and Q code P gate signal $v_{QII}(t)$, all of which can be expressed $$v_{III}(t)=v_I(t)\times s(t-\hat{\tau}^*)\times a(t-\hat{\tau}) \tag{8}$$

$$v_{IEI}(t)=v_I(t)\times s(t-\hat{\tau}^*+T_{DS/2})\times a(t-\hat{\tau}) \tag{9}$$

$$v_{ILI}(t)=v_I(t)\times s(t-\hat{\tau}-T_{DS/2})\times a(t-\hat{\tau}) \tag{10}$$

$$v_{IIE}(t)=v_I(t)\times s(t-\hat{\tau}^*)\times a(t-\hat{\tau}+T_{DC/2}) \tag{11}$$

$$v_{IIL}(t)=v_I(t)\times s(t-\hat{\tau}^*)\times a(t-\hat{\tau}-T_{DC/2}) \tag{12}$$

$$v_{QII}(t)=v_Q(t)\times s(t-\hat{\tau}^*)\times a(t-\hat{\tau}) \tag{13}$$

These multiplications are implemented by first and second multipliers 19, 20 multiplying the I signal $v_I(t)$ with P gate sub-carrier reference signal $s(t-\hat{\tau}^*)$ and P gate code reference signal $a(t-\hat{\tau})$ to output first demodulated signal $v_{III}(t)$; third and fourth multipliers 21, 22 multiplying the I signal $v_I(t)$ with E gate sub-carrier reference signal and P gate code reference signal to output second demodulated signal $v_{IEI}(t)$; fifth and sixth multipliers 23, 24 multiplying the I signal $v_I(t)$ with L gate sub-carrier reference signal and P gate code reference signal to output third demodulated signal $v_{ILI}(t)$; first and seventh multipliers 19, 25 multiplying the I signal $v_I(t)$ with P gate sub-carrier reference signal and E gate code reference signal to output fourth demodulated signal $v_{IIE}(t)$; first and eighth multipliers 19, 26 multiplying the I signal $v_I(t)$ with P gate sub-carrier reference signal and L gate code reference signal to output fifth demodulated signal $v_{IIL}(t)$; and ninth and tenth multipliers 27, 28 for multiplying the Q signal $v_Q(t)$ with P gate sub-carrier reference signal and P gate code reference signal to output sixth demodulated signal $v_{QII}(t)$.

Figure 9:
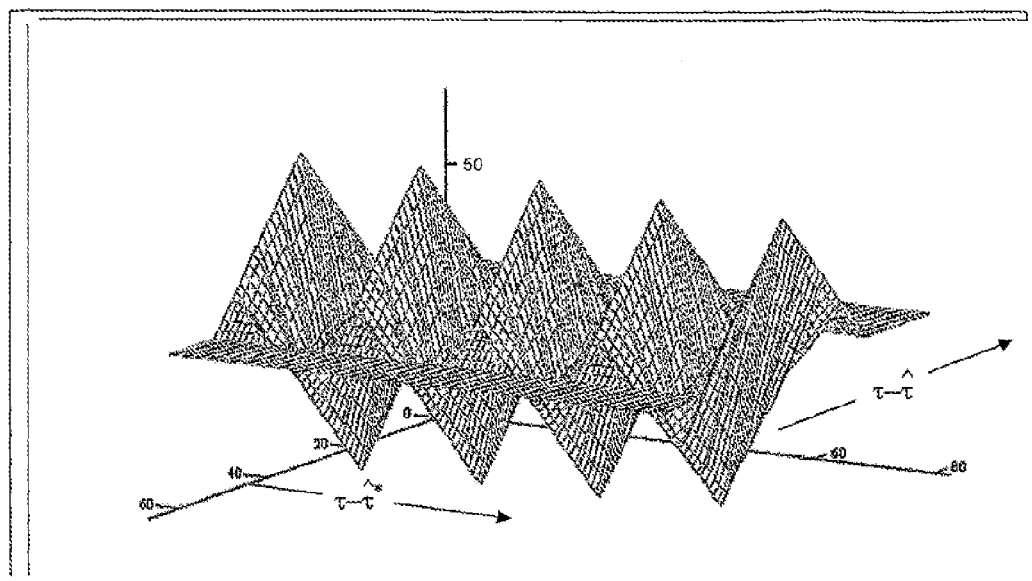
FIG. 9 is a graphical illustration of a two dimensional correlation function for the BOC modulated signal, which correlation function is used by the BOC receiver shown in FIGS. 5, 6,7 and 8.

The demodulated signals $v_{III}(t)$, $v_{IEI}(t)$, $v_{ILI}(t)$, $v_{IIE}(t)$, $v_{IIL}(t)$ and $v_{QII}(t)$ are then integrated by integrators 29 to 34 respectively. These integrators run over a fixed time, which in this embodiment is the same as the code period $T_G$. In other embodiments, the integration time T can be an integer multiple of this code period, so that the integration time is typically of the order of a few milliseconds in total. The output of each of the integrators 29 to 34 is sampled by the processing stage 10 at the end of each fixed time and then the integrators 29 to 34 reset to zero. The outputs of the integrators 29 to 34 can be described by a set of six correlations $w_{III}[k]$, $w_{IEI}[k]$, $w_{ILI}[k]$, $w_{IIE}[k]$, $w_{IIL}[k]$ and $w_{QII}[k]$ for each sample k=1, 2, 3 . . . . The values of these correlations depend of the difference between the trial phase $\hat{\phi}$ and the true phase $\phi$, the difference between the trial sub-carrier delay $\hat{\tau}^*$ and the offset sub-carrier delay $\tau^*$, and the difference between the trial code delay $\hat{\tau}$ and the true code delay $\tau$. The I sub-carrier P gate and code P gate correlation $w_{III}[k]$ can be expressed $$w_{III}[k] = A \times \cos(\phi-\hat{\phi}) \times \chi(\hat{\tau}^*, \hat{\tau}-\tau) \times d^* \quad (14)$$

where $\chi( \ldots )$ is a two-dimensional correlation function, as shown in FIG. 9. The two-dimensional correlation function $\chi( \ldots )$ has multiple peaks when the trial code delay $\hat{\tau}$ equals the true code delay $\tau$ $$\hat{\tau} = \tau \quad (15)$$

and the trial sub-carrier delay $\hat{\tau}^*$ is equal to any of the multiple values of the sub-carrier code delay $\tau^*$, i.e. the true code delay $\tau$ plus a positive or negative integer n multiple of the sub-carrier symbol duration $T_S$ $$\hat{\tau}^* = \tau + nT_S \quad (16)$$

Figure 10:
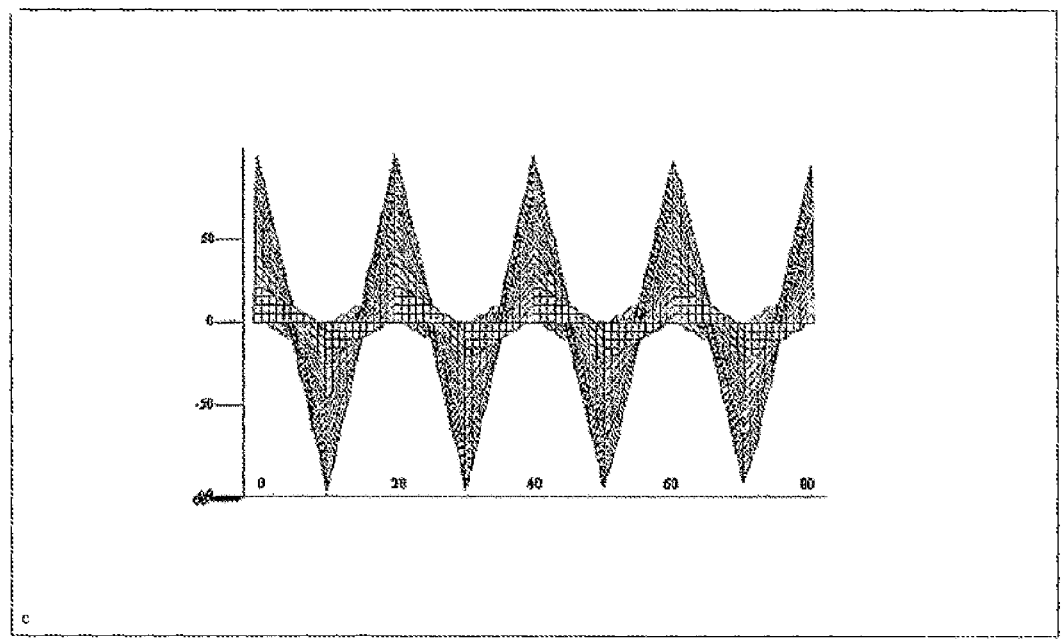
FIG. 10 is a cross section in the sub-carrier trial delay dimension of the correlation function shown in the FIG. 9.
Figure 11:
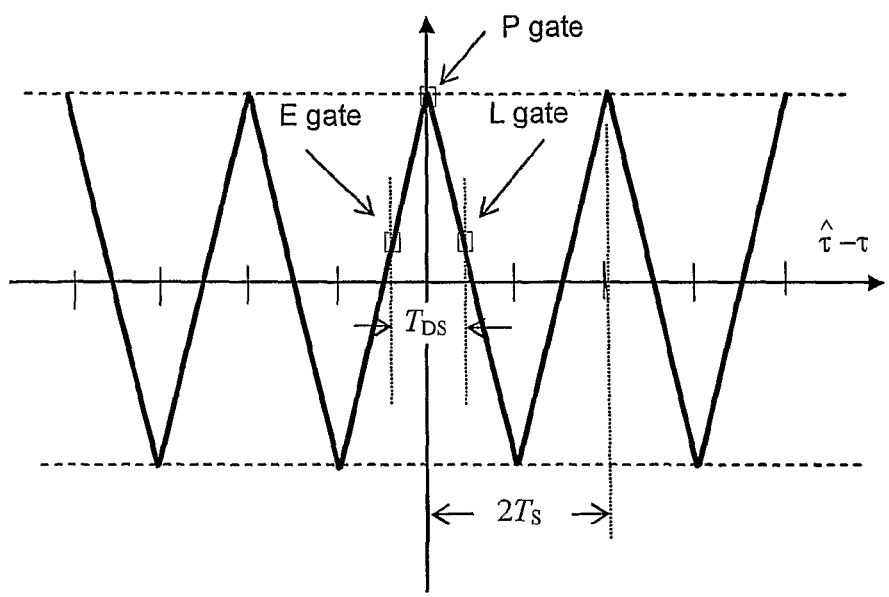
FIG. 11 is the nominal correlation in the sub-carrier trial delay dimension only.
Figure 12:
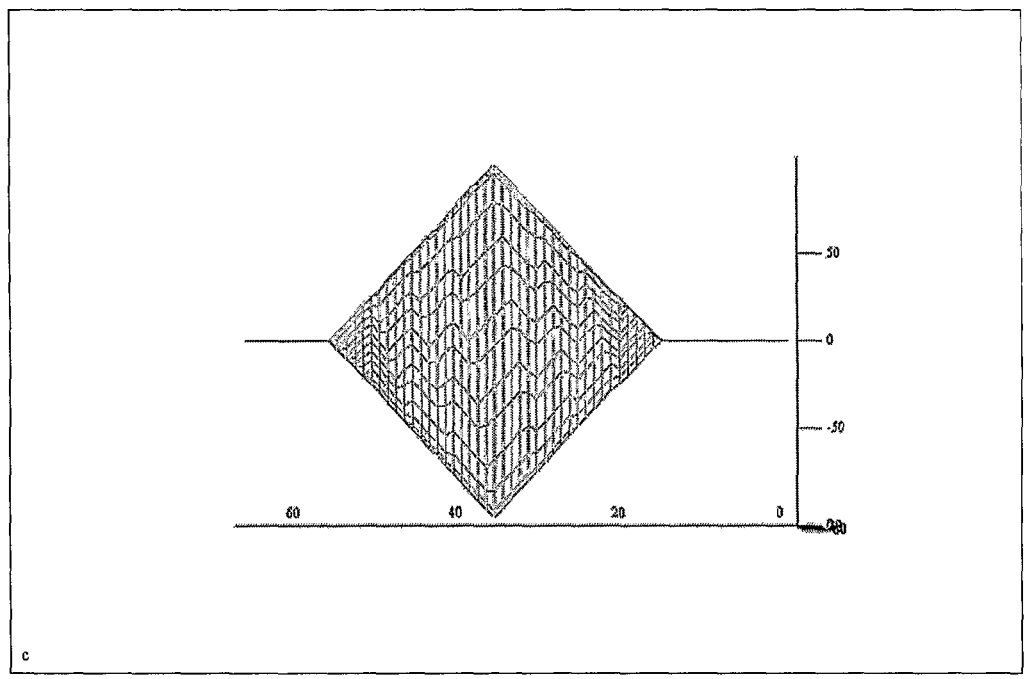
FIG. 12 is a cross section in the code delay dimension of the correlation function shown in FIG. 9.
Figure 13:
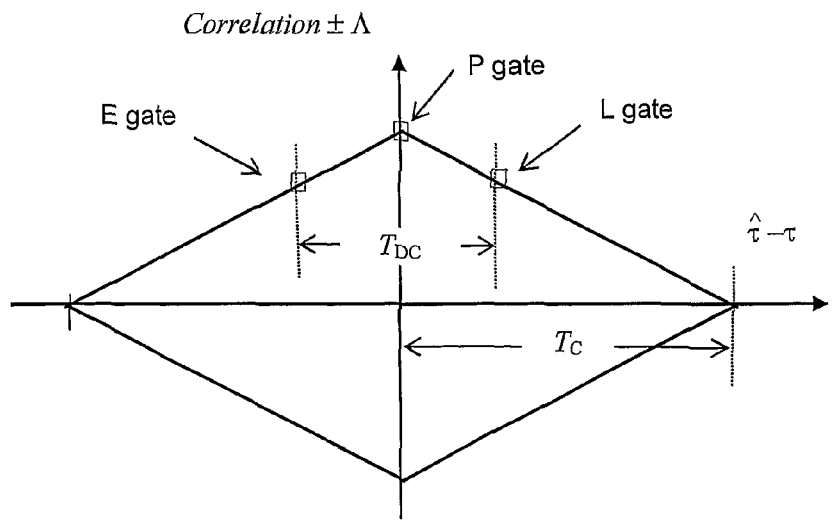
FIG. 13 is the nominal correlation in the code delay dimension only.

For explanatory purposes, the I sub-carrier P gate and code P gate correlation $w_{III}[k]$ can be approximated by the expression $$w_{III}[k] \approx A \times \cos(\phi-\hat{\phi}) \times \text{trc}(\hat{\tau}^*-\tau^*) \times \Lambda(\hat{\tau}-\tau) \times d^* \quad (17)$$

where trc( ) is a continuous triangular cosine of periodicity $2T_S$ and $\Lambda( )$ is the correlation function of a PSK modulated signal having the same code rate as the received signal. The acceptability of this approximation can be appreciated from FIGS. 10 to 13, where it can be seen that the continuous triangular cosine function trc( . . . ) shown in FIG. 11 is very similar to a view of the two-dimensional function $\chi( \ldots )$ just in the dimension of the difference between the trial sub-carrier delay $\hat{\tau}^*$ and true sub-carrier delay $\tau^*$ as shown in FIG. 10; while the PSK correlation function $\Lambda( \ldots )$ shown in FIG. 13 is very similar to a view of the two-dimensional function $\chi( \ldots )$ just in the dimension of the difference between the trial code delay $\hat{\tau}$ and true code delay $\tau$ as shown in FIG. 12.

The other correlations $w_{IEI}[k]$, $w_{ILI}[k]$, $w_{IIE}[k]$, $w_{IIL}[k]$ and $w_{QII}[k]$ are likewise sufficiently well approximated mathematically by $$w_{IEI}[k] \approx A \times \cos(\phi-\hat{\phi}) \times \text{trc}(\hat{\tau}^*-\tau^*-T_{DS}/2) \times \Lambda(\hat{\tau}-\tau) \times d^* \quad (18)$$

$$w_{ILI}[k] \approx A \times \cos(\phi-\hat{\phi}) \times \text{trc}(\hat{\tau}^*-\tau^*+T_{DS}/2) \times \Lambda(\hat{\tau}-\tau) \times d^* \quad (19)$$

$$w_{IIE}[k] \approx A \times \cos(\phi-\hat{\phi}) \times \text{trc}(\hat{\tau}^*-\tau^*) \times \Lambda(\hat{\tau}-\tau-T_{DC}/2) \times d^* \quad (20)$$

$$w_{IIL}[k] \approx A \times \cos(\phi-\hat{\phi}) \times \text{trc}(\hat{\tau}^*-\tau^*) \times \Lambda(\hat{\tau}-\tau+T_{DC}/2) \times d^* \quad (21)$$

$$w_{QII}[k] \approx A \times \sin(\phi-\hat{\phi}) \times \text{trc}(\hat{\tau}^*-\tau^*) \times \Lambda(\hat{\tau}-\tau) \times d^* \quad (22)$$

It can be appreciated that, when the I sub-carrier P gate and I code P gate correlation $w_{III}[k]$ peaks, this is because the I sub-carrier E gate and I code P gate correlation $w_{IEI}[k]$ has the same amplitude as the I sub-carrier L gate and I code P gate correlation $w_{ILI}[k]$, i.e. $w_{IEI}[k]=w_1[k]$, where the E and L gates for the sub-carrier reference signal have the same value, as seen in FIG. 11. It is also because the I sub-carrier P gate and I code E gate correlation $w_{IIE}[k]$ has the same amplitude as the I sub-carrier P gate and I code L gate correlation $w_{IIL}[k]$, i.e. $w_{IIE}[k]=w_{IIL}[k]$, where the E and L gates for the code reference signal have the same value, as shown in FIG. 13. Inspection of these equations further shows that in a tracking state the phase estimate $\hat{\phi}$ must be the same as the true phase $\phi$ plus or minus an integer number of carrier half cycles. This condition is known to exist when the Q sub-carrier P gate and Q sub-carrier P gate correlation $w_{QII}[k]$ is zero, i.e. $w_{QII}[k]=0$, because the sine function in expression (22) is zero, signifying the case of carrier lock.

Figure 14:
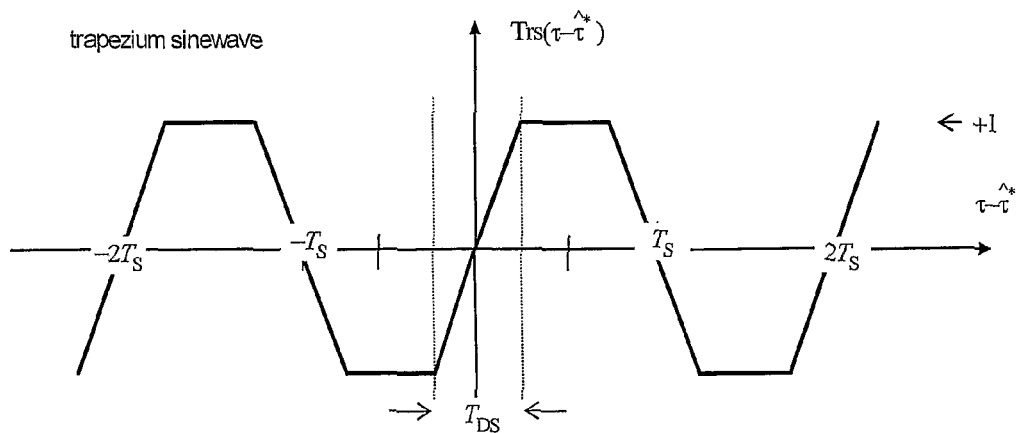
FIG. 14 is a discriminator function in the sub-carrier delay dimension only.

Any difference between the I sub-carrier E gate and I code P gate correlation $w_{IEI}[k]$ and the I sub-carrier L gate and I code P gate correlation $w_{ILI}[k]$ is proportional to the difference between the sub-carrier trial delay $\hat{\tau}^*$ and the nearest multi-value of the sub-carrier delay $\tau^*$. Consequently, the processing stage 10 carries out a subtraction step 35 that subtracts the I sub-carrier E gate and I code P gate correlation $w_{ILI}[k]$ from the I sub-carrier L gate and I code P gate correlation $w_{IEI}[k]$ to give a sub-carrier difference correlation $w_{IQI}[k]$. This can then be expressed $$w_{IQI}[k] \approx A \times \cos(\phi-\hat{\phi}) \times \text{Trs}(\tau^*-\hat{\tau}^*) \times \Lambda(\hat{\tau}-\tau) \times d^* \quad (23)$$

where Trs( . . . ) is a trapezium sine discriminator function depending on the difference between the trial sub-carrier delay $\hat{\tau}^*$ and the multivalued sub-carrier delay $\tau^*$, and which therefore decreases in magnitude as $\hat{\tau}^*$ approaches $\tau^*$ as shown in FIG. 14.

Figure 15:
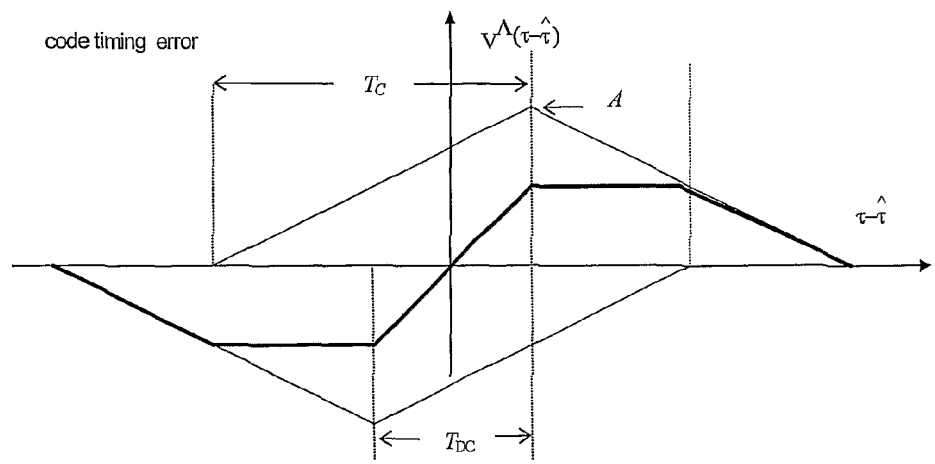
FIG. 15 is a discriminator function in the code delay dimension only.

Similarly, any difference between the I sub-carrier P gate and I code E gate correlation $w_{IIE}[k]$ and the I sub-carrier P gate and I code L gate correlation $w_{IIL}[k]$ is proportional to the difference between the trial code delay $\hat{\tau}$ and the true code delay $\tau$. Consequently, the processing stage 10 carries out a subtraction step 36 that subtracts the I sub-carrier P gate and I code E gate correlation $w_{IEI}[k]$ from the I sub-carrier P gate and I code L gate correlation $w_{ILI}[k]$ to give a code difference correlation $w_{IIQ}[k]$. This can then be expressed $$w_{IIQ}[k] \approx A \times \cos(\phi-\hat{\phi}) \times \text{trc}(\hat{\tau}^*-\tau^*) \times {}_V\Lambda(\tau-\hat{\tau}) \times d^* \quad (24)$$

where ${}_V\Lambda( )$ is a discriminator function shown in FIG. 15.

NB It should be noted that in this account an E gate is subtracted from an L gate in order to ensure correct polarity of loop correction in terms of a code and sub-carrier delay estimate. In an equivalent description an L gate is subtracted from an E gate, in order to ensure correct polarity of loop correction in terms of a code and sub-carrier=phase estimate.

Finally, any non-zero value of the Q sub-carrier P gate and Q sub-carrier P gate correlation $w_{QII}[k]$ is approximately proportional to the difference between the trial phase $\hat{\phi}$ and the true phase $\phi$.

Error signals $e_\phi[k]$, $e_{\tau^*}[k]$ and $e_\tau[k]$ are generated from the correlations in order to steer the trial phase $\hat{\phi}$, trial sub-carrier delay $\hat{\tau}^*$ and trial code delay $\hat{\tau}$ respectively toward the true phase $\phi$, true sub-carrier delay $\tau^*$ and true code delay $\tau$. The processing stage 10 carries out a limiter step 37 to estimate the sign of the I sub-carrier P gate and code P gate correlation $w_{III}[k]$ (which may be either positive or negative). Expressed mathematically this reads $$\hat{d} \leftarrow \text{sgn}(w_{III}) \quad (25)$$

where the 'sgn' function delivers either +1 or −1 depending on the polarity of the correlation.

Every T s, notated here as an event by a unit increment in count k, the processing stage 10 then computes the three feed-back error signals $e_\phi[k]$, $e_{\tau^*}[k]$ and $e_\tau[k]$ at multiplication steps 38, 39, 40 by multiplying the respective Q sub-carrier P gate and Q code P gate correlation $w_{QII}[k]$, sub-carrier difference correlation $w_{IQI}[k]$ and code difference correlation $w_{IIQ}[k]$ by the sgn( ) signal $\hat{d}[k]$. So, the error signals $e_\phi[k]$, $e_{\tau^*}[k]$ and $e_\tau[k]$ can be expressed $$e_\phi \leftarrow w_{QII} \times \hat{d} \tag{26}$$

$$e_{\tau^*} \leftarrow w_{IQI} \times \hat{d} \tag{27}$$

$$e_\tau \leftarrow w_{IIQ} \times \hat{d} \tag{28}$$

The count notation '[k]' is deliberately omitted since in the actual algorithm this count need not be recorded The processing stage then filters the error signals $e_\phi[k]$, $e_{\tau^*}[k]$ and $e_\tau[k]$ at loop filter steps 41, 42, and 43 respectively to increment or decrement the trial phase $\hat{\phi}$, sub-carrier trial delay $\hat{\tau}^*$ and code trial delay $\hat{\tau}$. These actions can be expressed iteratively as $$f_\phi \leftarrow f_\phi + e_\phi$$

$$\hat{\phi} \leftarrow \hat{\phi} + k_1 f_\phi + k_2 e_\phi \tag{29a}$$

$$\hat{\tau}^* \leftarrow \hat{\tau}^* + k_{\tau^*} e_{\tau^*} \tag{29b}$$

$$\hat{\tau} \leftarrow \hat{\tau} + k_\tau e_\tau \tag{29c}$$

Again, the count notation '[k]' is deliberately omitted since in the actual algorithm this count need not be recorded In this embodiment the carrier phase correction is implemented by a second order loop, where phase error $e_\phi$ increments an integrated phase error $f_\phi$, which direct and integrated errors update a current phase estimate via two gain constants $k_1$ and $k_2$. The SLL time estimate implements a first order loop via a gain constant $k_{\tau^*}$, and the DLL time estimate implements a first order loop via a gain constant $k_\tau$ With increasing count and in the realistic presence of noise these errors go to zero on average i.e. $e_\phi[k] \to 0$, $e_\tau[k] \to 0$ and $e_{\tau^*}[k] \to 0$ Finally, in this first embodiment of the correction stage a subtractor 44 computes the instantaneous difference between the code trial delay and the sub-carrier trial delay:

$$\Delta\hat{\tau} = \hat{\tau} - \hat{\tau}^* \tag{30}$$

Provided noise is not excessive then dividing by $T_S$ will automatically find the correct integer offset n between $\hat{\tau}^*$ and $\hat{\tau}$. The calculation, performed every correlation interval, to a best estimate is then $$\hat{\tau}^+ = \hat{\tau}^* + \text{round}\left(\frac{\hat{\tau} - \hat{\tau}^*}{T_S}\right) \times T_S \tag{31}$$

In this final stage it is admitted that the estimates $\hat{\tau}^*[k]$ and $\hat{\tau}[k]$ are necessarily linked, because the difference between them, after rounding, should be an integer multiple of the sub chip width $T_S$, assuming that both loops are locked (converged) and the input $C/N_0$ is sufficiently high. This best combination of the two estimates is updated every correlation interval.

The system as described above with reference to FIGS. 5-15 eliminates the possibility of slip or false node tracking in a BOC receiver while fully exploiting the potential of BOC modulation. This calculation automatically combines the low error of the SLL estimate with the non-ambiguous DLL estimate to get the best of both worlds.

As an essential qualification is noted that the system fails if the loops lose lock. But this is true of all loop-based systems. The system also fails if the difference of estimates falls randomly outside the bounds $$\left(n - \frac{1}{n}\right)T_S < \Delta\hat{\tau} < \left(n + \frac{1}{n}\right)T_S \tag{32}$$

which in principle can occur because of excessive noise in the DLL estimate, even if the loops are in lock, for too low an input carrier to noise density ratio (CNDR) and/or too high a loop bandwidth $B_L$. Theory finds however that this restriction on the allowed range of CNDR and $B_L$. is not practically onerous. In this basic embodiment the value of the DLL gate width $T_{DC}$, which controls the DLL discriminator action is a compromise. It must be chosen somewhere in the range $T_S \le T_{DC} \le T_{CI}$. Setting $T_{DC}$ equal to chip width $T_C$ gives the fastest response of the DLL in the initial tracking. Setting $T_{DC}$ equal to the BOC sub-chip width $T_S$ will however minimise the noise in the DLL estimate and extend the basic performance envelope. Such a failure condition is however fail safe since the receiver can always measure for itself when this condition has arisen.

Practical Implementation

The correlator architecture of a GNSS BOC receiver requires relatively few changes compared to a GNSS PSK receiver in order to implement the dual estimate in a triple loop technique. A general schematic of a correlator channel of the dual-estimate triple-loop receiver was shown in FIG. 6. The incoming signal is mixed with, i.e. multiplied by, replica carrier, sub carrier and code waveforms each derived from separate digitally controlled oscillators (DCO). The resulting signal combinations are accumulated over the code period and the six correlation results formed, every correlation interval.

The correlator is arranged to produce an interrupt at least once every code epoch to instruct the processor to read the new accumulator values. New estimates of carrier, sub carrier and code phase are then calculated and all three DCOs are updated. Each of the carrier, sub carrier and code DCOs are updated in three independent tracking loops. Provided that lock is achieved and maintained on the incoming signal the navigational data can be demodulated and processed. This process is equivalent in both hardware and software receivers.

Figure 18:
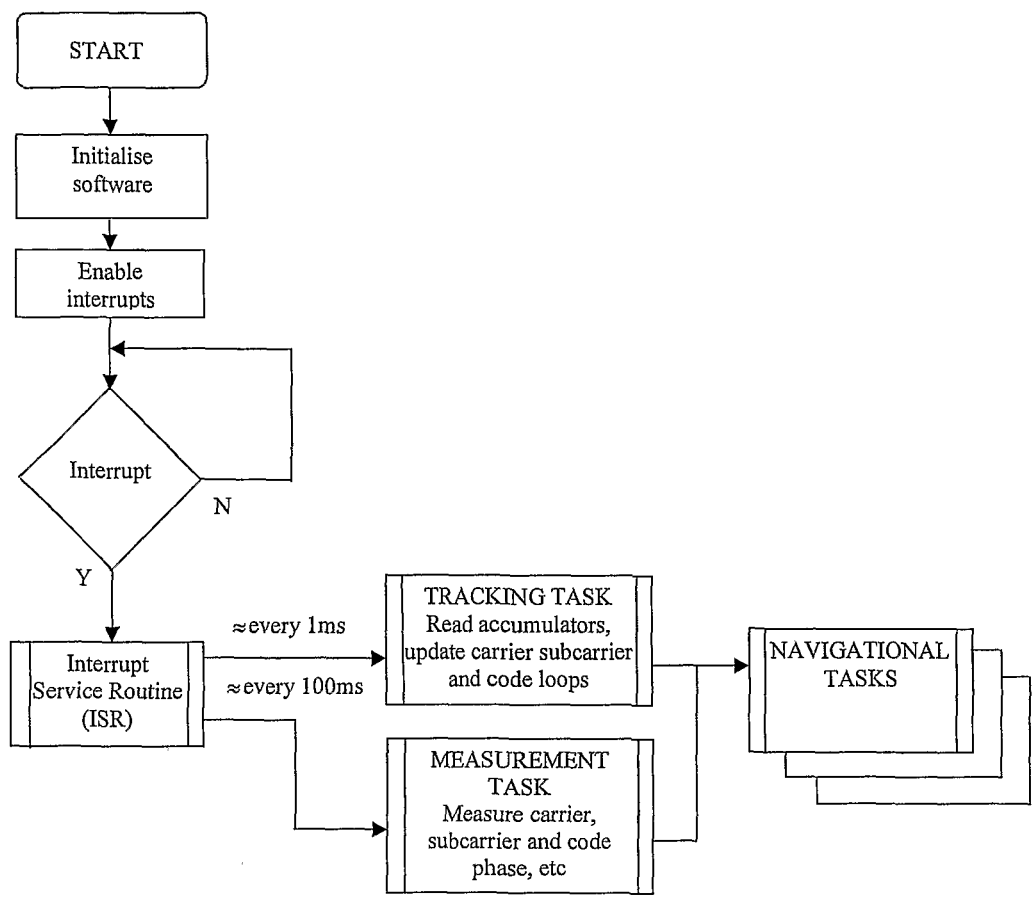
FIG. 18 shows an example of the top-level operations and tasks of a GNSS software receiver.

FIG. 18 shows an example of the top-level operations and tasks of a GNSS software receiver according to a further embodiment of the invention. The initialisation involves setting up the software and starting the correlator channels running. After initialisation the software enables the software interrupts. Typically two types of interrupt are used; a fast rate ($\approx$1 ms) interrupt for the tracking task which takes the highest priority and a slower rate ($\approx$100 ms) interrupt for the measurement task which is given a lower priority. The tracking task reads the accumulator values, estimates the navigational data state and updates all three loops with new estimates of carrier, sub carrier and code phase. The measurement task provides the detailed measurements required to form the navigation solution such as reading the carrier, sub carrier and code DCO values and necessary counters in the correlator. Under these essential tasks priority can be given to the various navigational tasks.

Table T1 shows the hardware requirements of each correlator channel based on receiver architecture designed to operate at an intermediate frequency IF of 11.38 MHz, with a 50 MHz sampling rate, 100 ms measurement interval (TIC period) and 2-bit quantisation. The hardware requirements of the triple loop receiver as detailed in Table 1 are easily achievable (12 channels or more) with most modern ASIC and FPGA designs.

TABLE 1

Hardware requirements of triple loop architecture per channel.

| Components | Size | Number required per channel |
|---|---|---|
| Multipliers | 4 × 1 | 8 |
|  | 2 × 2 | 4 |
|  | 2 × 4 | 2 |
| Digitally Controlled Oscillators (DCO) | 31 bits (frequency resolution = 23.03 mHz) | 3 (Carrier, Sub carrier and Code DCOs) |
| Accumulators | 19 bits | 8 |
| Counters | 21 bits (carrier cycles in 100 ms) | 1 |
|  | 20 bits (sub carrier cycles up to 10.23 MHz) | 1 |
|  | 20 bits (code chips up to 10.23 Mcps) | 1 |
|  | 11 bits (epoch counter 1 ms epochs) | 1 |
| Registers | 31 bits (phase register) | 3 (Carrier, Sub carrier and Code DCO phase) |

Extensions and Improvements
Faster Dynamic Response with Max Sensitivity

Figure 8:
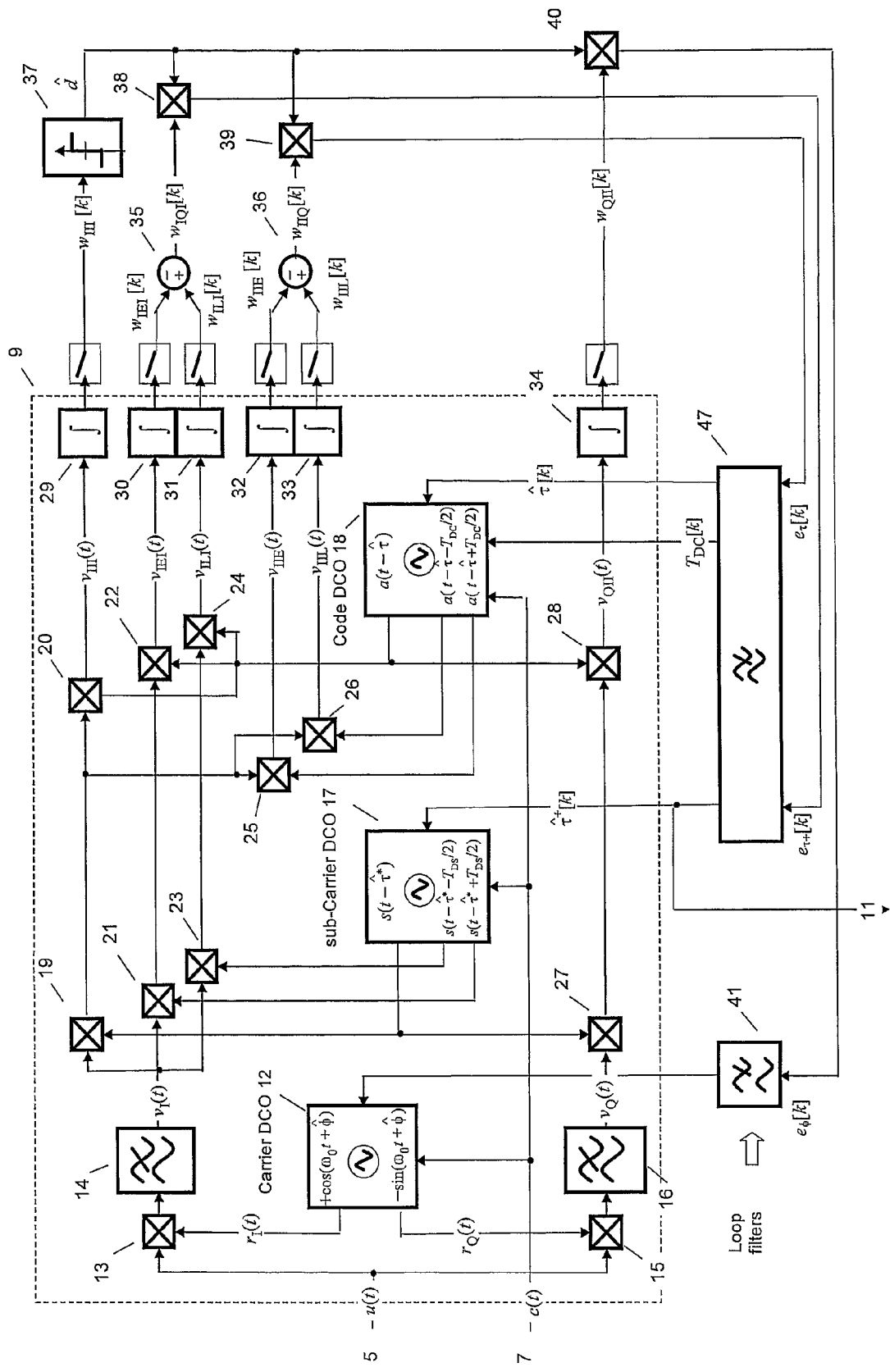
FIG. 8 is a functional expansion of a receiver according to a further embodiment of the invention.

A significant extension and improvement to the above basic system is shown in FIG. 8, compared to FIG. 7. In this embodiment the blocks and processes 42 43 44, 45 and 46 are replaced by a block 47 whose content and function will be described and also summarised in pseudo code. Execution of this block is synchronised to every correlation and is updated every correlation interval T The same two timing errors $e_{\tau*}[k]$ and $e_\tau[k]$ which were output from multipliers 38 and 39 respectively are now input to 47. The aim is again to generate two independent timing estimates to drive the sub-carrier DCO (17) and the code DCO 18 within an SLL and DLL respectively. The three different timing estimates, $\hat{\tau}*[k]$, $\hat{\tau}[k]$ and $\hat{\tau}^+[k]$ in the basic system are however reduced to two: the same unambiguous lower accuracy $\hat{\tau}[k]$, generated by the DLL but now the single potentially ambiguous but higher accuracy estimate $\hat{\tau}^+[k]$ generated by the SLL is automatically integer corrected by the DLL. In this embodiment within block 47 error signals first update these two estimates (lines 33-1. 33-2). The filtered difference $\Delta\hat{\tau}$ between SLL estimate $\hat{\tau}^+[k]$ and the DLL estimate was evaluated on previous iteration (previous integer k value). If the magnitude of this difference is now found to have exceeded half a sub-chip width (line 33-3) then the high accuracy estimate is deemed to have slipped and is appropriately incremented or decremented (line 33-4) and the difference $\Delta\hat{\tau}$ reset to zero (line 33-5). Further, in line 33-6 the DLL gate width is suddenly expanded from whatever is its current narrower width ($T_{DC}$) to a full chip width $T_C$. The purpose of this manoeuvre is to speed up acquisition because it is likely that the DLL is in the process of acquiring lock. A typical simulation in the lower graph of FIG. 16 for the dotted line shows this effect at around count 65.

Otherwise the filtered difference between the two estimates has not exceeded half a sub-chip width (line 33-7). In which case a first order difference filter updates filtered $\Delta\hat{\tau}$ in line 33-8 using the newly available updates $\hat{\tau}^+[k]$ and $\hat{\tau}[k]$ from lines 33-1 and 33-2 respectively. A gain term $K_F$ controls the response time of this difference filter. Further, the gate width $T_{DC}$ is reduced by a gate controller line 33-9, and in due course, over a sufficient number of iterations this width will continue to reduce asymptotically to a minimum value-made here to be equal to the sub-chip width $T_S$. This effect can be seen in lower graph dotted line from around count 120 in FIG. 16. The settling time of this asymptotic reduction is determined by a controller gain $K_D$.

The point of controlling the DLL gate downwards to this minimum is in order to minimise the noise in the DLL loop, which if excessive could trigger a false decision in line 33-3. In this way the operating range of the receiver is extended downwards to the lowest possible carrier to noise density ratio $C/N_0$. for a given loop bandwidth $B_L$. In this embodiment the DLL gate width $T_{DC}[k]$ therefore becomes a dynamic variable over the range $T_S \leq T_{DC} \leq T_C$—as indicated by an arrow 48 pointing from block 47 to the DCO generator 18. Within block 47 a possible extension written in pseudo-code $\rightarrow e_\tau, e_{\tau*}, \Delta\hat{\tau}, \hat{\tau}^+, \hat{\tau}, T_{DC}$ $\hat{\tau}^+ \leftarrow \hat{\tau}^+ + k_{\tau*} e_{\tau*}$ SLL update (33-1)

$\hat{\tau} \leftarrow \hat{\tau} + k_\tau e_\tau$ DLL update (33-2)

If $|\Delta\hat{\tau}| > T_S/2$ (33-3)

$\hat{\tau}^+ \leftarrow \hat{\tau}^+ + \text{sgn}(\Delta\hat{\tau}) \times T_S$ (33-4)

$\Delta\hat{\tau} \leftarrow 0$ (33-5)

$T_{DC} \leftarrow T_C$ (33-6)

otherwise (33-7)

$\Delta\hat{\tau} \leftarrow K_F \times (\hat{\tau} - \hat{\tau}^+ - \Delta\hat{\tau}) + \Delta\hat{\tau}$ (33-8)

$T_{DC} \leftarrow K_D \times (T_S - T_{DC}) + T_{DC}$ (33-9)

$\leftarrow \Delta\hat{\tau}, \hat{\tau}^+, \hat{\tau}, T_{DC}$

Additional Correlations for Out of Lock Conditions

Not shown in either FIG. 7 or FIG. 8 are potential improvements and alternatives, obtainable from computing further processing the down converted signals $v_{IEE}(t) = v_I(t) \times s(t - \hat{\tau}* + T_{DS/2}) \times a(t - \hat{\tau} + T_{DC/2})$ (35)

$v_{ILE}(t) = v_I(t) \times s(t - \hat{\tau}* - T_{DS/2}) \times a(t - \hat{\tau} + T_{DC/2})$ (36)

$v_{IEL}(t) = v_I(t) \times s(t - \hat{\tau}* + T_{DS/2}) \times a(t - \hat{\tau} - T_{DC/2})$ (37)

$v_{ILL}(t) = v_I(t) \times s(t - \hat{\tau}* - T_{DS/2}) \times a(t - \hat{\tau} - T_{DC/2})$ (38)

$v_{QEI}(t) = v_Q(t) \times s(t - \hat{\tau}* + T_{DS/2}) \times a(t - \hat{\tau})$ (39)

$v_{QLI}(t) = v_Q(t) \times s(t - \hat{\tau}* - T_{DS/2}) \times a(t - \hat{\tau})$ (40)

$v_{QIE}(t) = v_Q(t) \times s(t - \hat{\tau}*) \times a(t - \hat{\tau} + T_{DC/2})$ (41)

$v_{QIL}(t) = v_Q(t) \times s(t - \hat{\tau}*) \times a(t - \hat{\tau} - T_{DC/2})$ (42)

from which may be integrated to corresponding correlations every T seconds to $w_{IEE}[k]$, $w_{ILE}[k]$, $w_{IEL}[k]$, $w_{ILL}[k]$, $w_{QEI}[k]$, $w_{QLI}[k]$, $w_{QIE}[k]$, $w_{QIL}[k]$ respectively. Further, there may be extracted correlation differences $w_{IQQ} = (w_{ILL} - w_{IEL}) - (w_{ILE} - w_{IEE})$ (43)

$w_{QQI} = w_{QLI} - w_{QEI}$ (44)

$w_{QIQ} = w_{QIL} - w_{QIE}$ (45)

These correlations may be used to enhance and generalise operation of the invention in many different ways.

For example from (24) it can be realized that, when the estimating process is far from lock i.e. when $\hat{\tau}^*$ is far away from $\tau^*$, then because of the relatively small amplitude to trc( ) the correction gain to $\tau^*$ will be small because the amplitude of trc( ) is relatively small. The consequence is a slow updating of $\hat{\tau}^*$. To deal with this an additional term (ii) can be added to (28) for updating the DLL error, which now reads $$e_\tau \leftarrow \underset{i}{w_{IIQ} \times \hat{d}} + \underset{ii}{B \times w_{IQQ} \times w_{IQI}} \quad (46)$$

where B is an appropriate scaling constant. This action can be seen to be beneficial because $$w_{IQQ} \approx A \times \cos(\phi - \hat{\phi}) \times \text{Trs}(\tau^* - \hat{\tau}^*) \times \gamma^\Lambda(\tau - \hat{\tau}) \times d^*$$

$$w_{IQI} \approx A \times \cos(\phi - \hat{\phi}) \times \text{Trs}(\tau^* - \hat{\tau}^*) \times \Lambda(\tau - \hat{\tau}) \times d^* \quad (47)$$

the trapezium sine function Trs( ) will have greater amplitude than trc( ) when $\hat{\tau}^*$ is sufficiently far from $\tau^*$. Compare (17) and (24)

The aim here is to provide a boost to DLL acquisition if and when the SLL is far off lock and the correlation term $w_{IIQ}$ has a temporarily small value Improvement from Carrier Aiding The invention admits the standard technique of carrier aiding—the technique of importing into the delay estimate a correction proportional to the Doppler frequency. The equations (29) can be modified accordingly to read $$\hat{\tau}^* \leftarrow \hat{\tau}^* + k_\phi \cdot f_\phi + k_{\tau^*} e_{\tau^*} \quad (48)$$

$$\hat{\tau} \leftarrow \hat{\tau} + k_\phi f_\phi + k_\tau e_\tau \quad (49)$$

Term $f_\phi$ is the same as in the PLL equations (29a) and is interpreted as a scaled Doppler shift estimate (either positive or negative depending on the sign of the relative motion). Constants $k_\phi$ and $k_{\phi^*}$ are pre-calculated to provide the necessary open loop correction of Doppler shift appropriately scaled down to the code rate and sub-carrier rate respectively Alternative Embodiments of Error Discriminators The computation to error sequences according to (26) (27) and (28) utilised only one of many possible discriminators. The standard alternatives available in the dual-loop single-estimate conventional PSK receivers may be adopted here, after appropriate modification PLL Discriminators From (25) and (26) the equivalent formulation is $$e_\phi \leftarrow w_{QII}[k] \times \text{sgn}(w_{III}) \quad (50)$$

Dispensing with sgn( ) operation gives $$e_\phi \leftarrow w_{QII}[k] \times w_{III} \quad (51)$$

Expressing this as a ratio gives $$e_\phi \leftarrow \frac{w_{QII}}{w_{III}} \quad (52)$$

To improve tracking when SLL is not yet in lock one can adopt $$e_\phi \leftarrow w_{QII} \times \text{sgn}(w_{III}) + w_{QQI} \times \text{sgn}(w_{IQI}) \quad (53)$$

from which removing sgn( ) gives $$e_\phi \leftarrow w_{QII} \times w_{III} + w_{QQI} \times w_{IQI} \quad (54)$$

SLL Discriminator

From (25) and (27) the equivalent formulation is $$e_{\tau^*} \leftarrow w_{IQI} \times \text{sgn}(w_{III}) \quad (55)$$

Dispensing with the sgn( ) operation gives $$e_{\tau^*} \leftarrow w_{IQI} \times w_{III} \quad (56)$$

Expressing this as a ratio gives $$e_{\tau^*} \leftarrow \frac{w_{IQI}}{w_{III}} \quad (57)$$

DLL Discriminator.

From (25) and (28) the equivalent formulation is $$e_\tau \leftarrow w_{IIQ} \times \text{sgn}(w_{III}) \quad (58)$$

Removing the sgn( ) operation gives $$e_\tau \leftarrow w_{IIQ} \times w_{III} \quad (59)$$

Improved convergence when SLL is not yet in lock $$e_\tau \leftarrow w_{IIQ} \times \text{sgn}(w_{III}) + w_{IQQ} \times \text{sgn}(w_{IQI}) \quad (60)$$

or even hybrid $$e_\tau \leftarrow w_{IIQ} \times \text{sgn}(w_{III}) + B \times w_{IQQ} \times w_{IQI} \quad (61)$$

Incoherent DLL Embodiment

It has been claimed that an incoherent DLL receiver is more effective for standard PSK GNSS. A representative paper is "Theory and Performance of narrow correlation spacing in a GPS receiver", A. J. Van Dierendonck et al ION National Technical Meeting San Diego Calif. January 1992. This concept requires a frequency locked loop (FLL) instead of a PLL. This type of system is readily incorporated into the dual estimate concept for BOC-GNSS requiring however some of the additional correlations identified from (35) to (42)

The implementation of an FLL requires only that the difference between the phase and the phase estimate $$\Delta\phi = \phi - \hat{\phi} \quad (62)$$

be made to settle at some arbitrary constant rather than zero. The aim however with the control of the time estimates in the two loops is again that $\hat{\tau}^* \to \tau + nT_S$ and $\hat{\tau} \to \tau$. But effective tracking of the SLL sub carrier phase (to yield estimate $\hat{\tau}^*$) and the DLL (to yield estimate $\hat{\tau}$) must generate an error signal which is indifferent to an arbitrary constant offset between $\hat{\phi}$ and $\phi$ It is necessary then to realise a frequency discriminator from the correlations and/or correlation differences, and to ensure that the SLL and DLL discriminators are indifferent to carrier phase error FLL Discriminators First we can compute a frequency error from current and previous correlations and correlation differences $$e_{\omega QI} \leftarrow w_{QII} \, \text{sgn}(w_{\overline{III}}) - w_{III} \, \text{sgn}(w_{\overline{QII}}) \quad (63)$$

where the notation $w_{\overline{III}}$ and $w_{\overline{QII}}$ stands for correlation in the previous correlation (earlier by T) One can also form $$e_{\omega II} \leftarrow w_{III} \, \text{sgn}(w_{\overline{III}}) + w_{QII} \, \text{sgn}(w_{\overline{QII}}) \quad (64)$$

which allows a 2-quadrant computation $$e_\omega = \frac{\langle e_{\omega QI} \rangle}{\langle e_{\omega II} \rangle} \approx \tan(\Delta\omega) \quad (65)$$

Alternatively a 4 quadrant computation $$e_\omega = \arctan 2 \langle e_{\omega QI} \rangle \langle \rangle e_{\omega II} \rangle \quad (66)$$

More robust acquisition can be used which allows for SLL not in lock as in previous embodiments:

$$e_{\omega Q} \leftarrow w_{QII} \operatorname{sgn}(w_{III}) - w_{III} \operatorname{sgn}(w_{\overline{Q}II}) + w_{QQI} \operatorname{sgn}(w_{IQI}) - w_{IQI} \operatorname{sgn}(w_{\overline{Q}QI}) \quad (67)$$

Similarly $$e_{\omega I} \leftarrow w_{III} \operatorname{sgn}(w_{III}) + w_{QII} \operatorname{sgn}(w_{\overline{Q}II}) + w_{IQI} \operatorname{sgn}(w_{IQI}) + w_{QQI} \operatorname{sgn}(w_{\overline{Q}QI}) \quad (68)$$

which allows a 2-quadrant computation $$e_\omega = \frac{\langle e_{\omega Q} \rangle}{\langle e_{\omega I} \rangle} \approx \tan(\Delta\omega) \quad (69)$$

Alternatively a 4 quadrant computation $$e_\omega = \arctan 2 \langle e_{\omega Q} \rangle \langle \rangle e_{\omega I} \rangle \approx \Delta\omega \quad (70)$$

Another alternative is to dispense with sgn functions as in (63) so that $$e_{\omega QI} \leftarrow w_{QII} w_{III} - w_{III} w_{\overline{Q}II} \quad (71)$$

and one can also form $$e_{\omega I} \leftarrow w_{III} w_{III} + w_{QII} w_{\overline{Q}II} \quad (72)$$

which again allows a 2-quadrant computation or a 4 quadrant comparison.

SLL Discriminator

The discriminator must work for an arbitrary phase difference $\Delta\phi$ Discriminator (27) does not work in this case, so we need to extend to $$e_{\tau^*} \leftarrow w_{IQI} \operatorname{sgn}(w_{III}) + w_{QQI} \operatorname{sgn}(w_{QII}) \quad (73)$$

One can dispense with sgn( ) to obtain $$e_{\tau^*} \leftarrow w_{IQI} w_{III} + w_{QQI} w_{QII} \quad (74)$$

DLL Discriminator

The discriminator must work for an arbitrary phase difference $\Delta\phi$ Discriminator (28) does not work in this case, so we need to extend to $$e_\tau \leftarrow w_{IIQ} \operatorname{sgn}(w_{III}) + w_{QIQ} \operatorname{sgn}(w_{QII}) \quad (75)$$

One can dispense with sgn( ) to obtain $$e_\tau \leftarrow w_{IIQ} w_{III} + w_{QIQ} w_{QII} \quad (76)$$

Computing the difference of power direct from early and late correlations gives $$e_\tau \leftarrow w_{IIL}^2 + w_{QIL}^2 - w_{IIE}^2 - w_{QIE}^2 \quad (77)$$

which one may enhance with further correlations to obtain $$e_\tau \leftarrow (w_{IIL}^2 + w_{QIL}^2 + w_{IQL}^2 + w_{QQL}^2) - (w_{IIE}^2 + w_{QIE}^2 + w_{IQE}^2 + w_{QQE}^2) \quad (78)$$

Computing the difference of amplitude direct from early and late correlations gives $$e_\tau \leftarrow \sqrt{w_{IIL}^2 - w_{QIL}^2} - \sqrt{w_{IIE}^2 + w_{QIE}^2} \quad (79)$$

and computing the normalised difference gives $$e_\tau \leftarrow \frac{\sqrt{w_{IIL}^2 - w_{QIL}^2} - \sqrt{w_{IIE}^2 + w_{QIE}^2}}{\sqrt{w_{IIL}^2 - w_{QIL}^2} - \sqrt{w_{IIE}^2 + w_{QIE}^2}} \quad (80)$$

Loop Operations

An appropriate modification for 'incoherent DLL' can be expressed in pseudo code as:

$$e_\phi \leftarrow e_\phi + e_{\omega I}$$

$$f_\phi \leftarrow f_\phi + e_\phi ]\text{FLL}$$

$$\hat{\phi} \leftarrow \hat{\phi} + k_1 f_\omega + k_2 e_\phi$$

$$\hat{\tau}^* \leftarrow \hat{\tau}^* + k_{\tau^*} e_{\tau^*} ]\text{SLL}$$

$$\hat{\tau} \leftarrow \hat{\tau} + k_\tau e_\tau ]\text{DLL''} \quad (81)$$

which can be extended by carrier aiding

Altboc Formulation

An original feature of the proposed Galileo GNSS is the proposal to include up to four different codes in the same transmission. Proposed extensions to BOC now put additional codes into the one structure.

Half AltBoc

The modulation can be written, instead of the usual complex variable formulation, in terms of in-phase and quadrature sub-carrier modulations. Initially for just two codes $$u_{BOC}(t) = A \times [a_1(t-\tau) + a_2(t-\tau)] \times s(t-\tau) \times \cos(\omega_c t + \phi) + A \times [a_1(t-\tau) - a_2(t-\tau)] \times \tilde{s}(t-\tau) \times \sin(\omega_c t + \phi) \quad (82)$$

Here $a_1(t)$ and $a_2(t)$ are the two different codes.

For simplicity the possible further modulation by data is omitted. The in-phase sub-carrier modulation s( ) may be a square sine wave (sqs( )) in which case the quadrature sub-carrier modulation $\tilde{s}$( ) is a square cosine wave (sqc( )). Alternatively the in-phase sub-carrier modulation s( ) may be a square cosine wave (sqc( )) in which case the quadrature sub-carrier modulation $\tilde{s}$( ) is a square sine wave (sqs( )).

It can be shown mathematically that the upper and lower sidebands individually are modulated by the separate codes.

In the embodiment of a dual estimator a reference is generated again according to (4) and (5) in order to create parallel I signal $v_I(t)$ and Q signal $v_Q(t)$ (in phase and quadrature). The mathematical structure of the two products after filtering may be described as $$v_I(t) = A \times \cos(\phi - \hat{\phi}) \times s(t-\tau) \times [a_1(t-\tau) + a_2(t-\tau)] + A \times \sin(\phi - \hat{\phi}) \times \tilde{s}(t-\tau) \times [a_1(t-\tau) - a_2(t-\tau)] \quad (83)$$

$$v_Q(t) = A \times \sin(\phi - \hat{\phi}) \times s(t-\tau) \times [a_1(t-\tau) + a_2(t-\tau)] - A \times \cos(\phi - \hat{\phi}) \times \tilde{s}(t-\tau) \times [a_1(t-\tau) - a_2(t-\tau)] \quad (84)$$

where $\hat{\phi}$ is the trial tracking phase.

The user has a choice in tracking either the sum or the difference of the codes. If intending to track the sum of the codes and not the difference of codes a further four waveform functions are created by multiplying test $v_I$ and $v_Q$ by a selection from analysing functions. There are early, prompt, and late formulations of sub-carrier $s(t-\hat{\tau}^*)$, and early, prompt and late formulations of code sum $a_1(t-\hat{\tau}^*) + a_2(t-\hat{\tau}^*)$ $$v_{III}(t) = v_I(t) \times s(t-\hat{\tau}^*) \times [a_1(t-\hat{\tau}) + a_2(t-\hat{\tau})] \quad (85)$$

$$v_{QII}(t) = v_Q(t) \times s(t-\hat{\tau}^*) \times [a_1(t-\hat{\tau}) + a_2(t-\hat{\tau})] \quad (86)$$

$$v_{IEI}(t) = v_I(t) \times s(t-\hat{\tau}^* + T_{DS}/2) \times [a_1(t-\hat{\tau}) + a_2(t-\hat{\tau})] \quad (87)$$

$$v_{ILI}(t) = v_I(t) \times s(t-\hat{\tau} - T_{DS}/2) \times [a_1(t-\hat{\tau}) + a_2(t-\hat{\tau})] \quad (88)$$

$$v_{IIE}(t) = v_I(t) \times s(t-\hat{\tau}^*) \times [a_1(t-\hat{\tau} + T_{DC}/2) + a_2(t-\hat{\tau} + T_{DC}/2)] \quad (89)$$

$$v_{IIL}(t) = v_I(t) \times s(t-\hat{\tau}^*) \times [a_1(t-\hat{\tau} - T_{DC}/2) + \tilde{a}_2(t-\hat{\tau} - T_{DC}/2)] \quad (90)$$

where $\hat{\tau}^*$ and $\hat{\tau}$ are again trial delay estimates. These waveforms are individually integrated and then sampled i.e. correlated to exactly the same functions as given from (17) to (22) and will ignore the right hand terms in (83) and (84)

which are modulated by the code difference. The reason is that the difference of codes is orthogonal to the sum of the codes and therefore will not contribute to any correlation.

Correlations are computed in the same manner as for ordinary BOC and appropriate correlation differences. All proceeds after in the same way as for ordinary BOC. It is equally possible to process appropriate demodulated waveforms with difference of codes Full AltBoc The concept of 'altboc' supports up to 4 modulations. The simplest formulation reads, and again without recourse to complex variable notation $$u(t) = A_1 \times [a_1(t-\tau) + a_2(t-\tau)] \times s(t-\tau) \times \cos(\omega_C t + \phi) + A_1 \times [a_1(t-\tau) - a_2(t-\tau)] \times \tilde{s}(t-\tau) \times \sin(\omega_C t + \phi) + A_2 \times [a_3(t-\tau) + a_4(t-\tau)] \times \tilde{s}(t-\tau) \times \cos(\omega_C t + \phi) + A_2 \times [a_3(t-\tau) - a_4(t-\tau)] \times s(t-\tau) \times \sin(\omega_C t + \phi) \quad (91)$$

which compared with (82) is seen to have two more terms embodying sum and difference of two more code functions $a_3(t)$ and $a_4(t)$. After multiplication by the carrier the down converted signals are $$v_I(t) = A_1 \times \cos(\phi - \hat{\phi}) \times s(t-\tau) \times [a_1(t-\tau) + a_2(t-\tau)] + A_1 \times \sin(\phi - \hat{\phi}) \times \tilde{s}(t-\tau) \times [a_1(t-\tau) - a_2(t-\tau)] A_2 \times \cos(\phi - \hat{\phi}) \times \tilde{s}(t-\tau) \times [a_3(t-\tau) + a_4(t-\tau)] + A_2 \times \sin(\phi - \hat{\phi}) \times s(t-\tau) \times [a_3(t-\tau) - a_4(t-\tau)] \quad (92)$$

$$v_Q(t) = A_1 \times \sin(\phi - \hat{\phi}) \times s(t-\tau) \times [a_1(t-\tau) + a_2(t-\tau)] - A_1 \times \cos(\phi - \hat{\phi}) \times \tilde{s}(t-\tau) \times [a_1(t-\tau) - a_2(t-\tau)] + A_2 \times \sin(\phi - \hat{\phi}) \times \tilde{s}(t-\tau) \times [a_3(t-\tau) + a_4(t-\tau)] - A_2 \times \cos(\phi - \hat{\phi}) \times s(t-\tau) \times [a_3(t-\tau) - a_4(t-\tau)] \quad (93)$$

Figure 16:
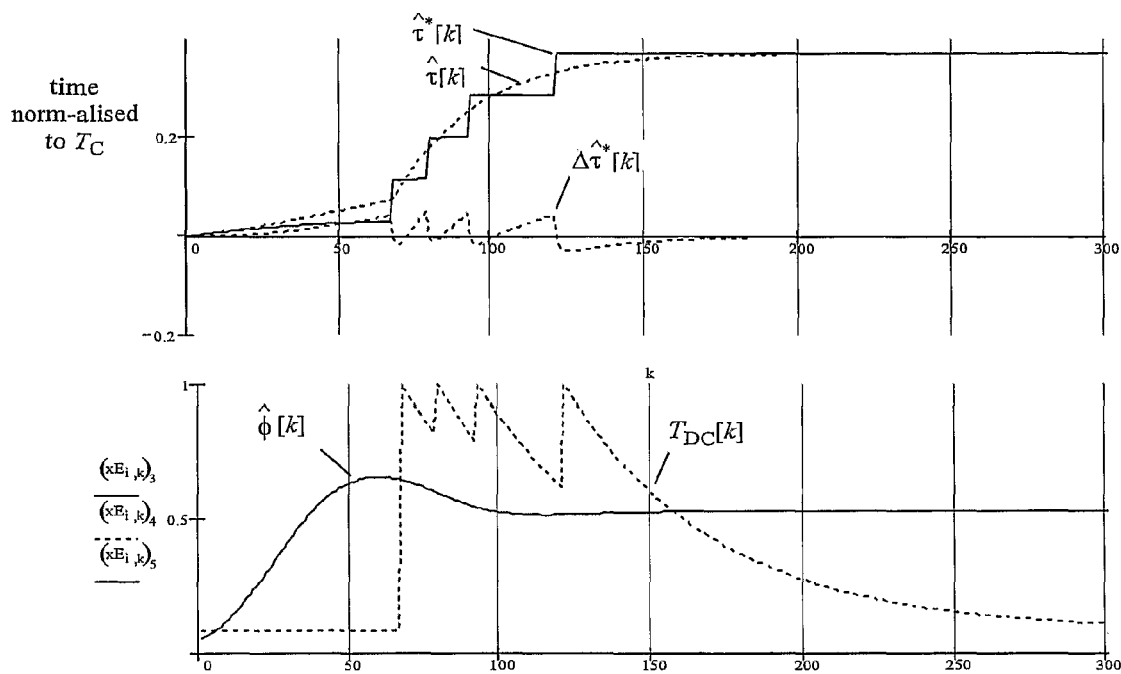
FIGS. 16 and 17 are computer-generated syntheses illustrating operation of the BOC receiver shown in FIG. 8.
Figure 17:
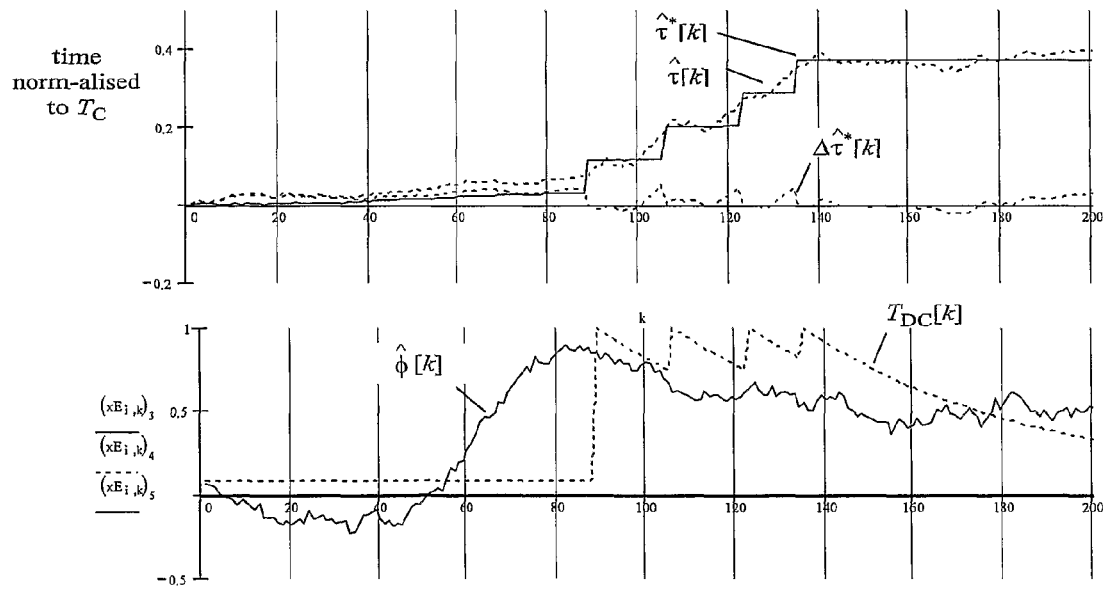

The ALTBOC signal may be tracked again with the sum or difference of $\alpha_1()$ and $\alpha_2()$. Alternatively it may be tracked with sum or difference of $a_3()$ and $a_4()$ Computer Generated Simulation FIGS. 16 and 17 show a simulation of the triple loop-dual estimator in action according to the embodiment of FIG. 8, and as described in earlier section. The chosen parameters are exactly the same in the two figures but without and with additive noise respectively. The aim here is not only to demonstrate the anti-slip fail safe nature of the triple loop but also to show a typical acquisition process. There is assumed to have been an initial search—just as in standard PSK-CDMA—which brings the code delay estimate within $\pm T_C$ of the actual input delay and therefore within range of the DLL discriminator.

Simulation values are deliberately chosen for the most stringent test of possible operation. The $C/N_0 = 250$ Hz is equivalent to 24 dBHz and is the very low value chosen in the already cited paper by Fine and Wilson. This carrier to noise density ratio is significantly lower than usual test conditions for GNSS signals. The BOC modulation is the most demanding highest proposed rate BOC($6f,f$). Correlation interval $T = 20$ ms gives 10 dB signal to I channel noise ratio Normalised chip width $T_C = 1$. Normalised sub-chip width $T_S = \frac{1}{12}$ The loop bandwidth of $B_L = 0.5$ Hz (an equivalent settling time $T_L = 1$ s) is the highest allowed for this low value of $C/N_0$ and highest rate ratio $f_S/f_C = 6$. The test here shows that the algorithm will simultaneously acquire both estimates and instantaneously correct the SLL estimate from the DLL estimate while the loops are locking up. Tracking performance depends on the difference the actual code delay and the initial setting of the loop estimates after an initial search. The example synthesised actual delay $\tau = \tau_0 = 4.45/12$ or $4.45 \times T_S$ which is near a worst-case start up condition with the DLL and SLL loops originally initialised in this example with $\hat{\tau}^* = 0$ and $\hat{\tau} = 0$ . . . . Filter gains $K_F = 0.5$ and $K_D = 0.02$ were chosen empirically as a result of these tests.

The rising dotted curve in the upper graph is the DLL estimate. Acquisition starts relatively slowly but speeds up on an automatic opening of the DLL gate at around count 65 in FIG. 16 (as confirmed by dotted curve in lower graph). The stepped continuous curve in upper graph is the corrected SLL estimate $\hat{\tau}^+$. The step occur whenever the filter difference $\Delta \hat{\tau}$ between this and the DLL estimate exceeds half a sub chip width. The whole point and purpose of the invention is demonstrated here: namely when the loops are active (and the signal to noise is high enough) it is impossible for the higher-accuracy lower noise SLL estimate to slip more than $\pm T_S/2$ out of alignment with the lower accuracy higher error DLL estimate. The dotted curve depicts filtered difference $\Delta \hat{\tau}$ tracking between these limits.

Acquisition is complete on a step at around 120 counts of 2.4 s which compares favourably with the nominal loop settling time $T_L \approx 1$ sec. The simulation also monitors the tracking of the third carrier tracking loop which here is a $2^{nd}$ order PLL. An input true carrier phase of $\phi = 30$ deg was adopted arbitrarily The continuous track on the lower graph is the phase estimate and shows the characteristic overshoot of a second order loop.

Similar but random results with additive electrical noise actually present are shown in example from FIG. 17. The acquisition time is accordingly a random variable. It can take longer (as here); or it can be shorter. The much higher quality of the SLL estimate compared to the DLL is evident.

The advantage of some embodiments of the present invention over the prior art may include the following: the method can realise the potential accuracy of BOC—as does the bump jumping method described in the prior art but without the inherent delay in that process. Discounting loop settling time (common to all systems) the correct estimate is essentially instantaneous. By contrast the bump jumping algorithm can be waiting for hundreds of milliseconds to several seconds before it 'knows' that it has locked onto the wrong peak, or 'false node'. The present invention avoids locking on a wrong peak (false node), provided uncritical requirements on input carrier to noise density ratio and loop bandwidth are met, since there is no multi-peaked correlation function in the first place. It is therefore fail safe. It is also insensitive to non-linear amplitude/frequency conversion that may be present in the transmission chain.

The described embodiments of the invention are only examples of how the invention may be implemented. Modifications, variations and changes to the described embodiments will occur to those having appropriate skills and knowledge. These modifications, variations and changes may be made without departure from the scope of the invention defined in the claims and its equivalents.

The invention claimed is:

1. A receiver for receiving a navigation signal comprising a carrier modulated by a code modulation function of a given code rate and further modulated by a sub-carrier modulation function having a sub-carrier rate different to the code rate, the receiver comprising a processor which comprises:
   a reference code signal generator arranged to generate a reference code signal;
   a reference sub-carrier signal generator arranged to generate a reference sub-carrier signal; wherein the processor is arranged to:
   generate a first estimate of delay using the reference code signal and a first feedback loop based on the code modulation;
   generate a second estimate of delay which is independent of the first estimate of delay using the reference subcarrier signal and a second feedback loop based on the sub-carrier modulation; and determine an optimal delay estimate from the first and second delay estimates.

2. A receiver according to claim 1 wherein the processor is arranged, in determining the optimal delay, to shift the second estimate by an integer number of sub-carrier half cycles to bring it towards the first estimate.

3. A receiver according to claim 1 wherein the processor is arranged, in determining the optimal delay estimate, to calculate a delay difference as the difference between the first and second estimates rounded to an integer number of sub-carrier half cycles.

4. A receiver according to claim 3 wherein the processor is arranged, in determining the optimal delay estimate, to add the delay difference to the second estimate of delay.

5. A receiver according to claim 1 wherein the processor is arranged to update the first and second estimates iteratively and to calculate the delay difference and add it to the second estimate repeatedly.

6. A receiver according to claim 1 wherein the processor is arranged to update the first and second estimates iteratively until they converge towards respective final values and to calculate the delay difference and the optimal delay from the final values.

7. A receiver according to claim 1 wherein the processor includes correlation means arranged to generate correlations based on the reference signals and at least one component of the received signal.

8. A receiver according to claim 7 wherein the processor is arranged to use the correlations to generate error estimations for the delay estimates, and to update the delay estimates based on the error estimations.

9. A receiver according to claim 1 wherein the at least one reference sub-carrier signal includes an early reference sub-carrier signal and a late reference sub-carrier signal separated by a gate width time difference.

10. A receiver according to claim 1 wherein the at least one reference code signal includes an early reference code signal and a late reference code signal separated by a gate width time difference.

11. A receiver according to claim 9 wherein the gate width time difference is variable.

12. A receiver according to claim 11 wherein the processor is arranged to vary the gate width time difference as the trial sub-carrier delay is updated.

13. A receiver according to claim 12 wherein the processor is arranged, in determining the optimal delay estimate, to calculate a delay difference as the difference between the first and second estimates rounded to an integer number of sub-carrier half cycles, and wherein the processor is arranged to detect a slip condition in the updating of the trial sub-carrier delay corresponding to a change in the estimated value of the integral number, and to increase the gate width time difference in response to the slip condition.

14. A receiver according to claim 7 wherein the correlation means is arranged to generate a plurality of correlations that vary in different ways as the trial delay approaches an actual delay and to combine them to determine the error estimation.

15. A receiver according to claim 14 wherein the processor is arranged to combine the correlations in a manner which varies as the delay approaches the actual delay to determine the error estimations.

16. A receiver for receiving a navigation signal comprising a carrier modulated by a code modulation function of a given code rate and further modulated by a sub-carrier modulation function having a sub-carrier rate different to the code rate, the receiver comprising a processor arranged to:

generate a first estimate of delay based on the code modulation;

generate a second estimate of delay based on the sub-carrier modulation;

determine an optimal delay estimate from the first and second delay estimates; and wherein the processor is arranged in determining the optimal delay, to shift the second estimate by an integer number of sub-carrier half cycles to bring it towards the first estimate.

17. A receiver for receiving a navigation signal comprising a carrier modulated by a code modulation function of a given code rate and further modulated by a sub-carrier modulation function having a sub-carrier rate different to the code rate, the receiver comprising a processor arranged to:

generate a first estimate of delay based on the code modulation;

generate a second estimate of delay based on the sub-carrier modulation;

determine an optimal delay estimate from the first and second delay estimates; and wherein the processor is arranged in determining the optimal delay estimate, to calculate a delay difference as the difference between the first and second estimates rounded to an integer number of sub-carrier half cycles.

18. A receiver for receiving a navigation signal comprising a carrier modulated by a code modulation function of a given code rate and further modulated by a sub-carrier modulation function having a sub-carrier rate different to the code rate, the receiver comprising a processor arranged to:

generate a first estimate of delay based on the code modulation;

generate a second estimate of delay based on the sub-carrier modulation; and determine an optimal delay estimate from the first and second delay estimates;

wherein the processor includes:

a reference code signal generator arranged to generate at least one reference code signal using the first estimate of delay;

a reference sub-carrier signal generator arranged to generate at least one reference sub-carrier signal using the second estimate of delay; and correlation means arranged to generate correlations based on the reference signals and at least one component of the received signal;

wherein the at least one reference sub-carrier signal includes an early reference sub-carrier signal and a late reference sub-carrier signal separated by a gate width time difference;

wherein the gate width time difference is variable and the processor is arranged to vary the gate width time difference as the trial sub-carrier delay is updated;

the processor is arranged in determining the optimal delay estimate, to calculate a delay difference as the difference between the first and second estimates rounded to an integer number of sub-carrier half cycles; and wherein the processor is arranged to detect a slip condition in the updating of the trial sub-carrier delay corresponding to a change in the estimated value of the integral number, and to increase the gate width time difference in response to the slip condition.

19. A receiver according to claim 1 wherein the first estimate is a lower accuracy estimate and is used to resolve ambiguities in the second higher accuracy estimate.

* * * * *